United States Patent [19]

Lang

[11] Patent Number: 5,289,273
[45] Date of Patent: Feb. 22, 1994

[54] ANIMATED CHARACTER SYSTEM WITH REAL-TIME CONTROL

[75] Inventor: Victor H. Lang, Ft. Collins, Colo.

[73] Assignee: Semborg-Recrob, Corp., Lansing, Ill.

[21] Appl. No.: 972,258

[22] Filed: Nov. 5, 1992

Related U.S. Application Data

[63] Continuation of Ser. No. 613,381, Nov. 13, 1990, Pat. No. 5,182,557, which is a continuation-in-part of Ser. No. 410,114, Sep. 28, 1989, Pat. No. 5,021,878.

[51] Int. Cl.$^5$ .................... A63H 13/00; G09B 9/048
[52] U.S. Cl. ......................... 348/121; 318/16;
            318/565; 364/578; 40/414
[58] Field of Search ............... 318/560, 561, 562, 565,
     318/566, 567, 16; 364/132, 148, 578; 901/1, 2,
       9, 14, 19, 46, 47; 40/411, 414; 358/103, 104

[56] References Cited

U.S. PATENT DOCUMENTS

| | | | |
|---|---|---|---|
| 3,557,304 | 1/1971 | Rue . | |
| 3,564,134 | 2/1971 | Rue . | |
| 3,767,901 | 10/1973 | Black et al. | 235/151 |
| 3,898,438 | 8/1975 | Nater et al. | 235/151 |
| 4,177,589 | 12/1979 | Villa | 40/457 |
| 4,312,276 | 1/1982 | Cory et al. | 104/38 |
| 4,405,943 | 9/1983 | Kanaly . | |
| 4,855,822 | 8/1989 | Narendra et al. | 358/103 |
| 4,878,878 | 11/1989 | Bittner | 446/139 |
| 4,942,538 | 7/1990 | Yuan et al. | 364/513 |
| 4,978,216 | 12/1990 | Liljegren et al. | 353/28 |
| 5,046,022 | 9/1991 | Conway et al. | 364/513 |
| 5,052,680 | 10/1991 | Malewicki et al. | 272/1 R |
| 5,091,849 | 2/1992 | Davis et al. | 395/100 |
| 5,105,367 | 4/1992 | Tsuchihashi et al. | 395/99 |

Primary Examiner—Bentsu Ro
Attorney, Agent, or Firm—Arnold, White & Durkee

[57] ABSTRACT

A system includes a control station for remotely controlling an animated character. Radio frequencies are used to transfer audio, video and other control signals to the animated character to provide speech, hearing, vision and practically any movement in real-time. A camera is used in the head of the animated character, and microphones are used in its ears to provide vision and hearing to a monitoring operator at the control station. A speaker is co-located with the animated character to generate sound from the operator. Servo control units are included within the animated character to provide a plurality of body movements. Other aspects of the animated character includes a multi-layer skin composite to make it appear more life-like, and an audio driver circuit for controlling the mouth of the animated character in proportion to the level of an audio signal generated at the control station.

20 Claims, 24 Drawing Sheets

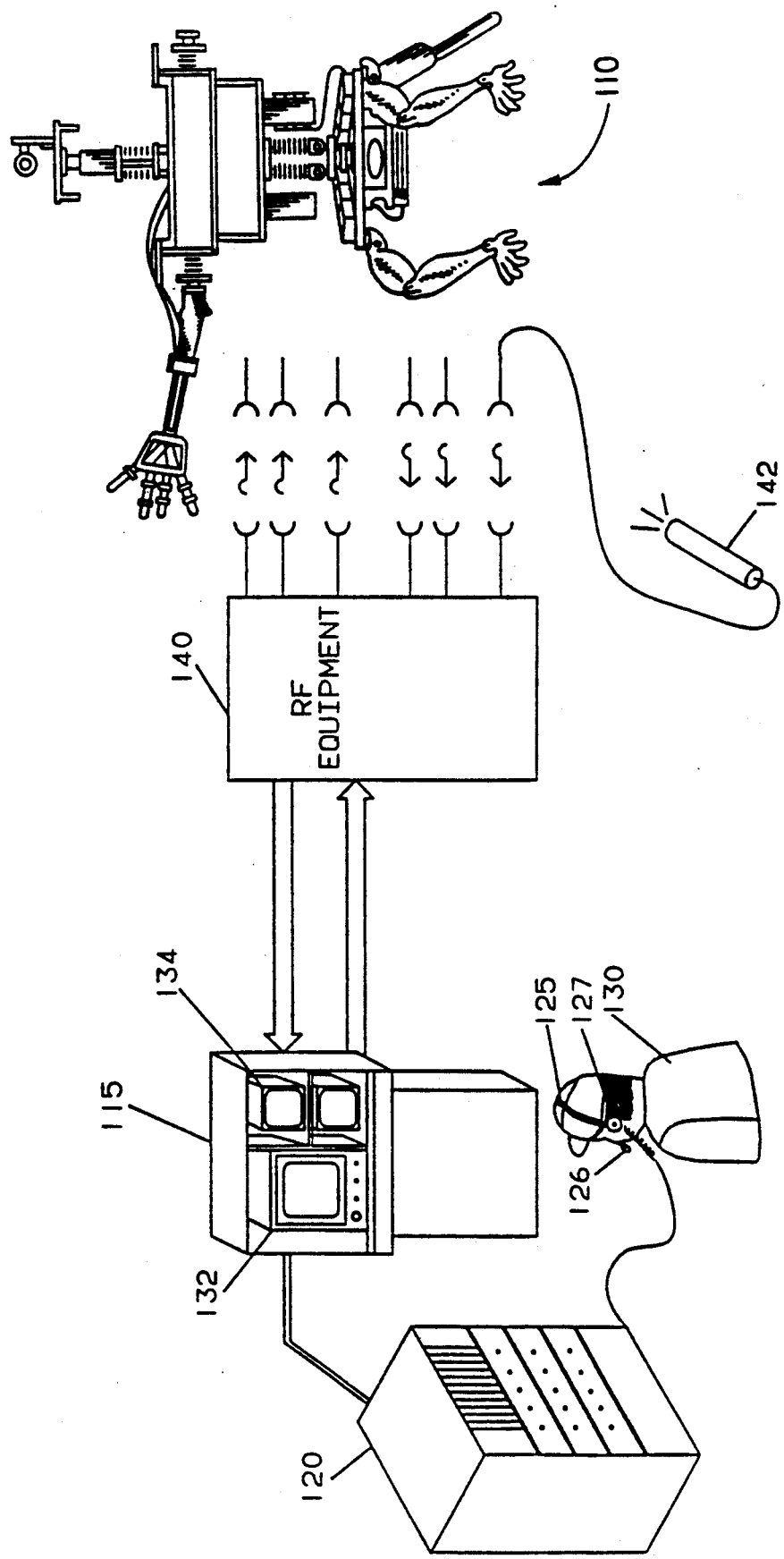

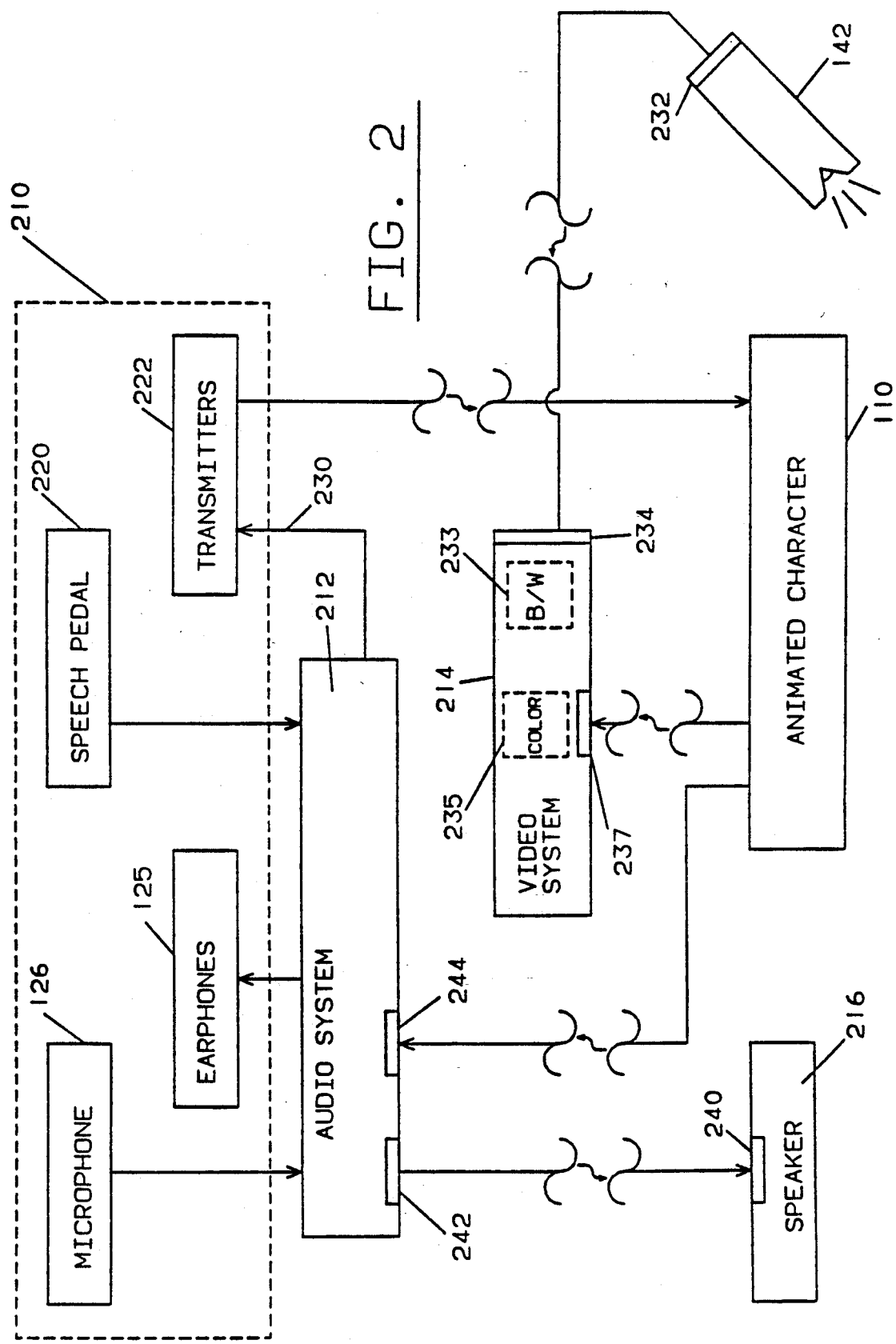

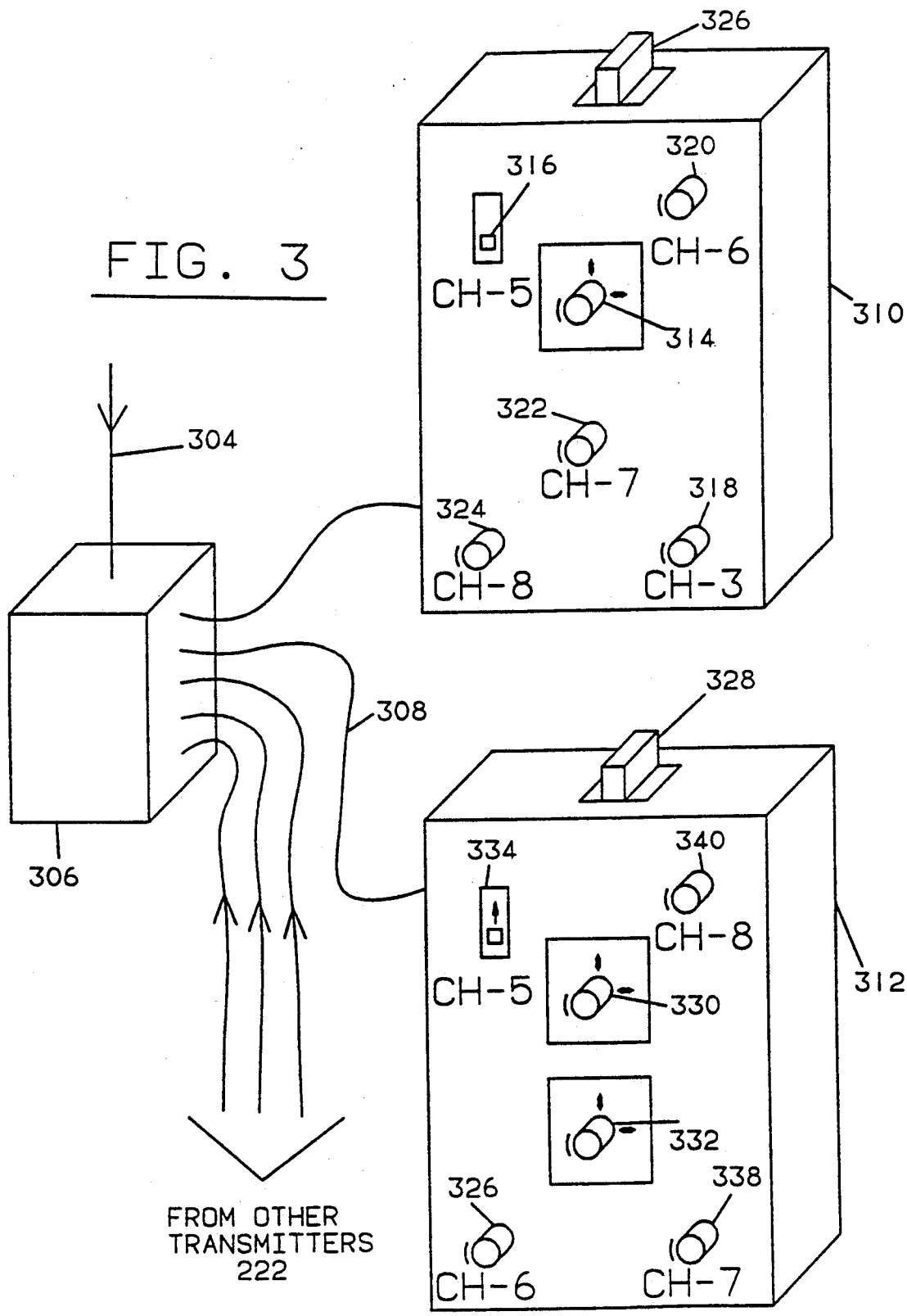

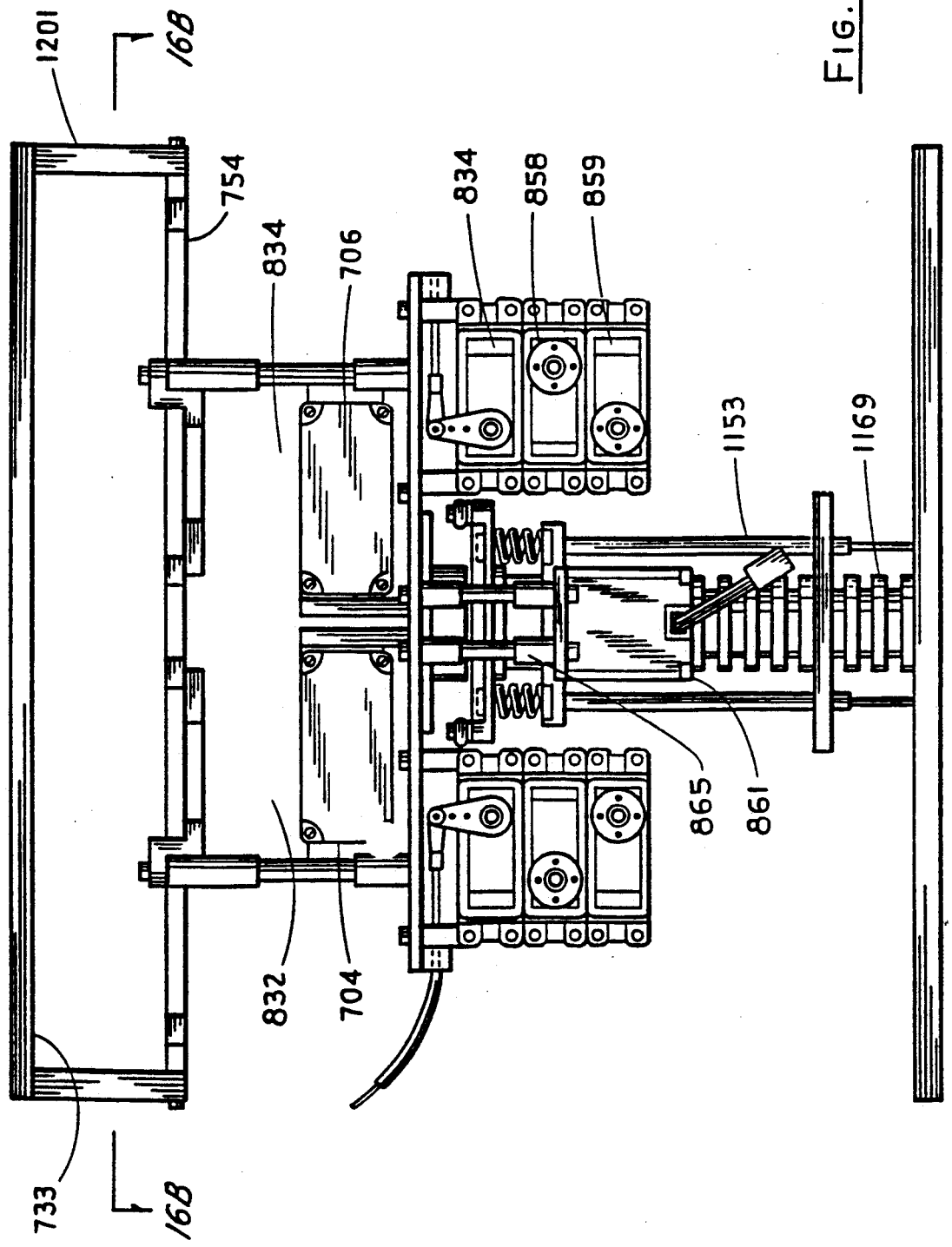

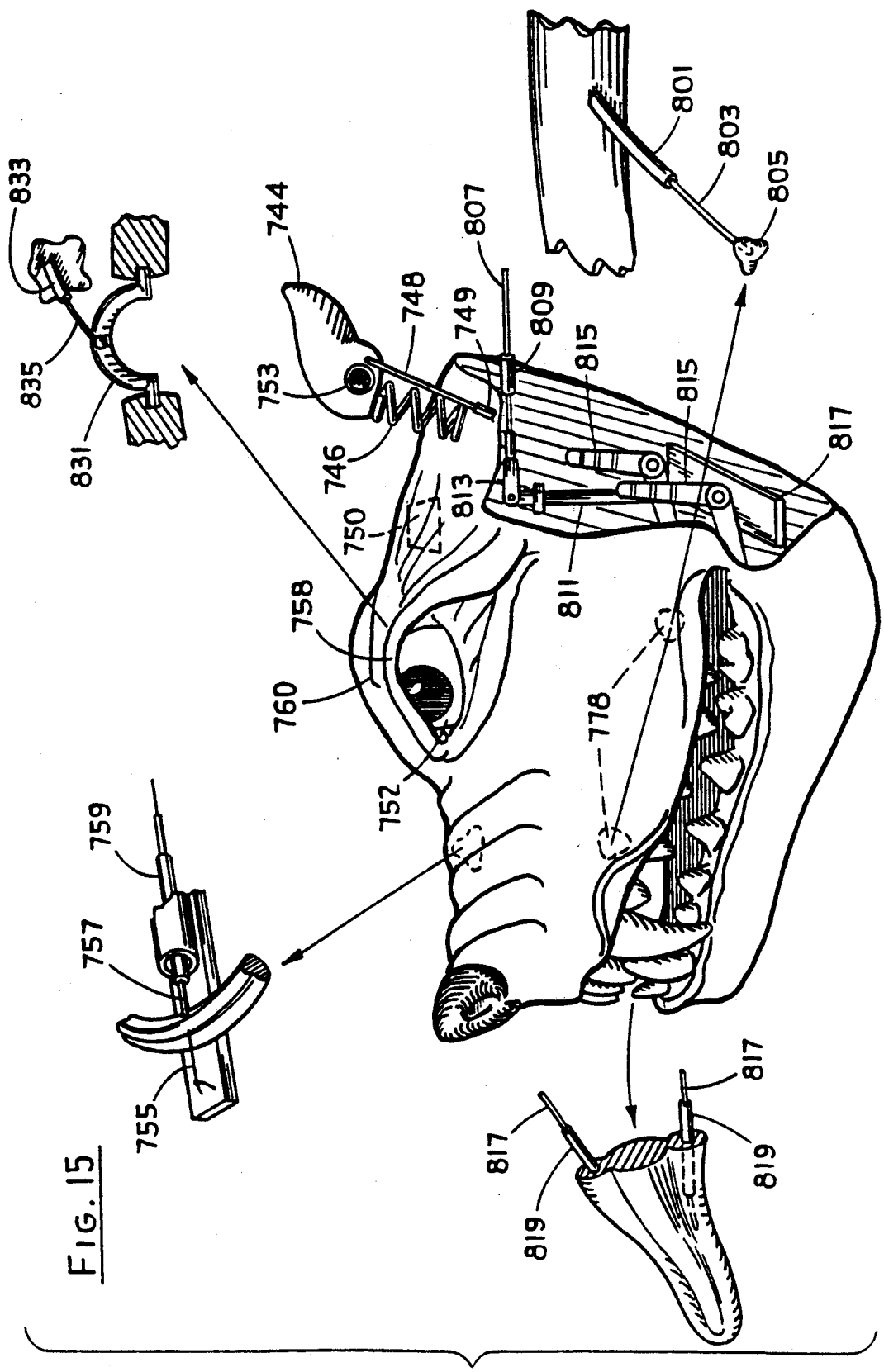

ANIMATED CHARACTER SYSTEM WITH REAL-TIME CONTROL

This application is a continuation of Ser. No. 613381 filed Nov. 13, 1990 now U.S. Pat. No. 5,182,557, which is a continuation-in-part of Ser. No. 410114 filed Sep. 28, 1989 now U.S. Pat. No. 5,021,878. U.S. Pat. No. 5,142,803 is also related to this application.

TECHNICAL FIELD

The present invention relates generally to animated characters, and, more particularly, to the practice of remotely controlling electro-mechanical animated characters to simulate life.

BACKGROUND ART

Animated characters have recently become a significant part of the entertainment and marketing fields. Consider, for example, movie characters "E.T." and "Gremlin" and the rock and roll creatures at Show-Biz Pizza Restaurants and Walt Disney. In most every instance, the ultimate goal has been to develop an animal-like creature having a human personality.

Unfortunately, animated characters in the prior art have been unable to simulate human life accurately. In simpler applications, the animated character comprises pneumatic and/or hydraulic devices that are remotely controlled according to a preprogrammed operation. Due to programming limitations, however, such animated characters are unable to react spontaneously to their surrounding environment with appropriate and realistic movements and speech. More complex animated characters in the prior art have been implemented for the movie screen by splicing different film shootings. For example, in one film shooting the animated character may be in the form of a puppet, while in other film shootings the animated character may be a person in a costume or a robot which is programmed for a particular sequence of steps.

SUMMARY OF INVENTION

In accordance with a preferred embodiment of the present invention, a system for controlling an animated character in real time allows the animated character to simulate vision, hearing, speech and movement in a manner which closely resembles a human being. The animated character includes a body having a video camera in its head for viewing images in front of the animated character and a microphone in each ear for detecting external sounds. In response to control signals generated from a remote control station, the animated character moves its head with respect to its body to respond appropriately to the surrounding environment.

The remote control station includes video monitors for displaying images viewed by the video camera in the head of the animated character. Additionally, a headset, including head phones and a microphone, is employed by an operator to listen to the sounds detected by the animated character and to talk to the audience through a speaker which is co-located with the animated character.

Preferably, the control station communicates with the animated character using radio frequency (RF) transmitters and receivers. RF communication is advantageous in that it avoids the use of wires or other umbilical type connections which takes away from the purpose of simulating human life.

Another aspect of the present invention involves a circuit for controlling the mouth of the animated character in proportion to an audio signal generated from the remote control station. The control circuit for the mouth includes a reference circuit (adjustor) for setting a reference position at which the mouth of the animated character is set in the absence of an audio signal. Responsive to the reference circuit and to the audio signal, an amplification circuit generates a control signal proportional to the amplitude of the audio signal. The control signal is then coupled to control the jaws or mouth of the animated character.

Another aspect of the present invention involves synthetic skin which is manufactured and used on the face, hands and feet of the animated character to simulate furless animal skin. The skin comprises a multi-layered composite including layers of elastic cloth, rubber and fine powder.

Yet another aspect of the present invention concerns the remote control of the anatomical joints of the animated character. Preferably, certain ones of the joints comprise two mechanical servo mechanisms for providing a force in response to a signal received from a remote source; a support member coupled to support part of the animated character; and cables, coupled between the support member and the servo mechanisms, for exerting a linear force on the support member with respect to the servo mechanisms. The remotely provided signal is used to move the part of the animated character, via the cables, so as to simulate real-life movement.

Yet another aspect of the present invention concerns a motorized three dimensional joystick that controls the movements of the head, waist or other components of the animated character. The joystick is also capable of other uses such as in video games. The joystick may be moved forward, backward, left, right or rotated and these movements of the joystick are connected to individual linear motors of the type used as fader controls for lights or audio. Each linear motor has memory and can be preprogrammed with a sequence of movements of the animated character. These preprogrammed movements can be replayed and the character will move in accordance with the preprogramming without an operator having to touch the joystick. The linear motors are touch sensitive, however, allowing an operator to interrupt the preprogrammed movement by grasping the joystick. This action overrides each linear motor allowing the operator to change the movements of the animated character from what was programmed. The joystick is connected to the individual linear motors by flexible cables and connecting rods. This connection provides a smooth accurate response to movement of the joystick while minimizing inertia in the system.

BRIEF DESCRIPTION OF THE DRAWINGS

Other objects and advantages of the invention will become apparent upon reading the following detailed description and upon reference to the accompanying drawings, in which:

FIG. 1 is a system diagram illustrating a perspective view of an animated character system 100, including an animated character 110, according to the present invention;

FIG. 2 is a block diagram of the animated character system 100 of FIG. 1;

FIG. 3 is a functional diagram illustrating controls on a single joystick transmitter 310 and on a dual joystick transmitter 312, each of which is used to provide eight separate control functions for an animated character 110 according to the present invention;

FIG. 9 is a rear view of the torso of the animated character 110 of FIG. 1;

FIG. 10b is a front view of one of the shoulders shown in FIG. 10a;

FIG. 10c is an end view of one of the shoulders shown in FIG. 10a;

FIG. 10d is a perspective view of the end of one of the shoulders shown in FIG. 10a;

FIG. 10e is a diagram illustrating the movement of the shoulder using a U-joint within one of the shoulders shown in FIG. 10a;

FIG. 15 is a sketch of a skull for the animated character 110, also in accordance with the present invention;

FIG. 16a is a front view of a plate 733 depicted along line 16a in FIG. 10a;

Figure 4A:
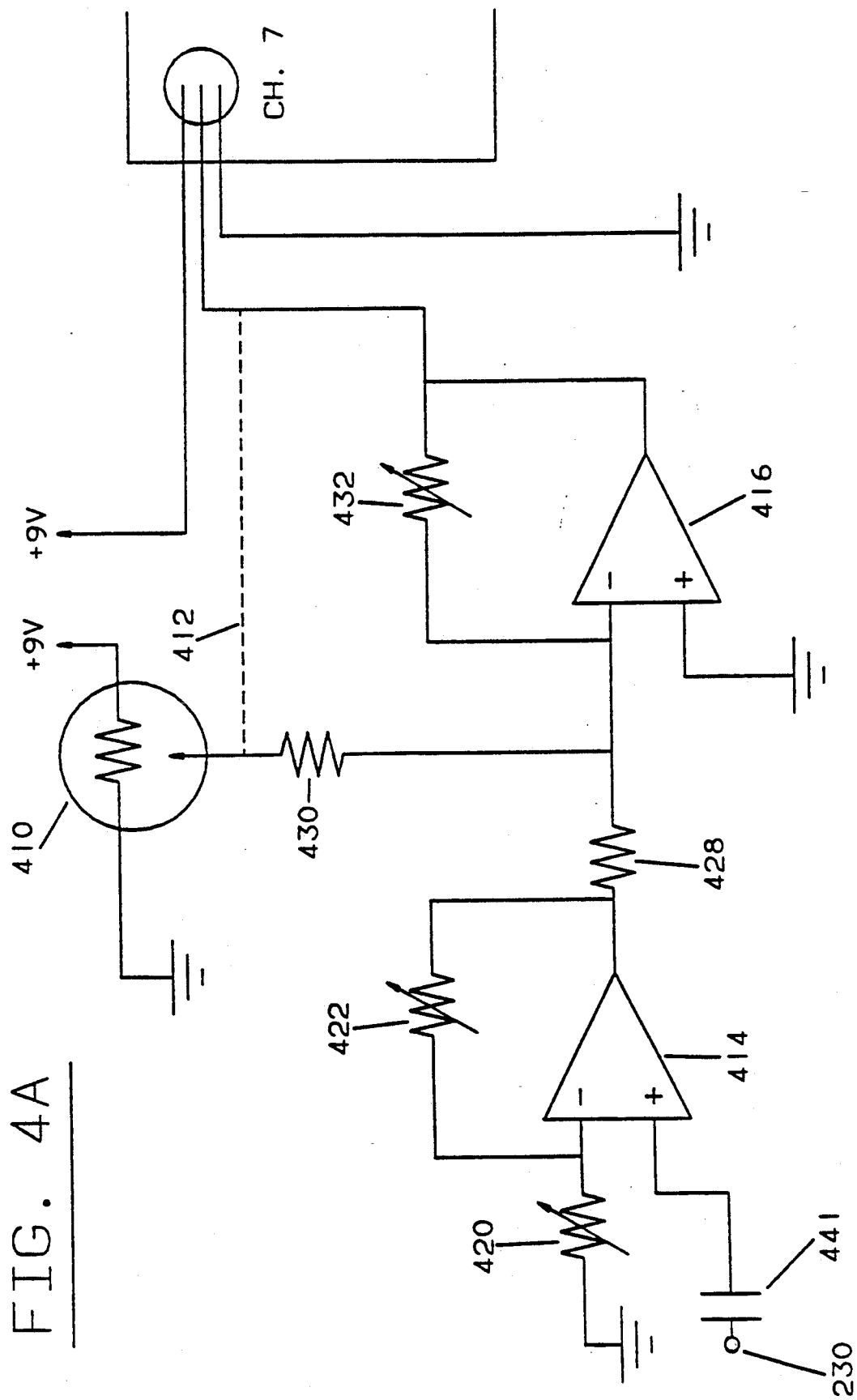
FIG. 4a is a schematic of a mouth driver circuit 400, according to the present invention, for controlling movement of the mouth of the animated character 110.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

Overview:

The present invention may be used in many applications requiring an animated character located to interact in real-time with other life. For example, the present invention is useful for remotely monitoring an area for security purposes. The present invention is particularly useful, however, for marketing products or sponsors before an audience; for example, at an amusement park, in a night club or on recorded or live television.

FIG. 1 illustrates a system 100 which is specifically designed for such marketing. The system 100 includes an animated character 110 along with video equipment 115, control equipment 120, a head set 125 and one or more operators 130 to control and monitor the animated character 110 such that the animated character 110 can see, hear, speak and move in response to its surrounding environment much like a human being.

The animated character 110 is coupled to the remaining portion of the system 100 using radio frequency (RF) equipment 140. This interface allows the operator 130 to control the movements and the speech of the animated character 110 and to monitor visually and audibly the surroundings of the animated character 110 remotely using the control equipment 120.

The control equipment 120 includes a plurality of control devices which are operated by the operator 130 to effect entire ranges of movements by the animated character 110 and to produce a variety of preprogrammed utterances through the animated character 110. Additionally, the operator 130 may employ a microphone 126 and earphones 127 (from the headset 125) to talk with and listen to the audience in real time. The headset 125 may be implemented using a Sony stereo headphone, Model MDR-V2, and the microphone 126 may be implemented using a Shure headset microphone, Model SM10A.

By using a microphone in each ear of the animated character 110, sounds to either side of the animated character may be differentiated through the headset 125 (in stereo) to provide appropriate real time control to the animated character 110. For example, in response to the detected sounds, the operator 130 is able to provide a variety of reactions of the animated character. These reactions include head movement in the direction of the detected sound, various facial expressions and mannerisms such as covering its ears with its hands and speaking in response to the sound.

The surroundings of the animated character 110 are monitored by the operator 130 using the video equipment 115, a video camera (722 of FIG. 7) internal to the animated character 110 and microphones (753 of FIG. 15) in its ears. The video equipment 115 includes a conventional color monitor 132 for displaying images received by the video camera, and a black and white monitor 134 for displaying the animated character 110 as perceived from the position of a video camera 142, preferably a Panasonic CD-40 type black and white camera. The video camera 142 is particularly useful in situations where the operator 130 cannot directly view the animated character 110.

Accordingly, the video, audio and control functions of the system 100 allow the animated character to be controlled by an operator in real time so that the animated character simulates a human being.

Control Station Operation

Referring now to FIG. 2, the system 100 is illustrated in block diagram form with focus on the audio, video and the portion of the system 100 that controls the movement of the animated character 110. The diagram in FIG. 2 includes a manually operated section 210 (shown in dotted lines), audio and video systems 212 and 214, a conventional audio speaker 216 which is co-located with the animated character 110, and the remote camera 142 of FIG. 1. The manually operated section 210 includes components which the operator physically manipulates to control the animated character 110. This section 210 includes the microphone 126 and the earphones 127, which operate as previously described, a speech pedal 220 and RF (radio frequency) transmitters 222.

The speech pedal 220 is used to select prestored speech (or sounds) for transmission, via the audio system, through the speaker 216. The speech pedal 220 is preferably a Midi Mitigator RFC1 type which includes a variety of conventional control pedals to retrieve utterances previously stored in the audio system 212. The Midi Mitigator RFC-1 also includes a digital display which may be programmed to indicate the category and type of sound presently selected by the foot pedals. For example, the Midi Mitigator RFC-1 may be programmed to record digital sounds in the following categories: product or sponsor endorsed remarks, jokes, voice impressions, rude noises and famous laughs. The foot pedals of the Midi Mitigator RFC-1 are used to select one of the above four categories, and then to select particular prerecorded entries within each category. Of course, every application and environment for the animated character 110 may require a unique set of prestored sounds and utterances.

The transmitters 222 are used to control manually various functions, primarily movement-related, of the animated character 110. Although this control may be implemented using a variety of communication means, radio frequencies (RF) are preferred. The preferred implementation of the transmitters 222 includes five 8-channel PCM (pulse code modulation) transmitters to provide collectively forty RF channels for controlling various parts of the animated character. Three of the five transmitters are preferably dual joystick transmitters of the type Futaba Model No. FP-T8SGA-T, and the other two are of the type Futaba Model No. FP-T8SSA-P. These transmitter types are commonly operated at about 50-72 mega-Hertz and include manual controls to control remotely hobby vehicles.

In FIG. 3, a functional diagram of a single joystick transmitter 310 and a dual joystick transmitter 312 is illustrated. The transmitters 310 and 312 may be modified to include larger power supplies, for example, eight 1.2 v Sub-C 1.4 hour Nicad power cells (or video game power supplies) available from Sanyo. Additionally, all the antennas from each of the five 8-channel transmitters may be replaced by a single one 304 of the replaced antennas such that the single antenna 304 is coupled to all five 8-channel transmitters using a conventional type N antenna combiner 306. Conventional connections 308 are made from the type N antenna combiner to the transmitter antenna ports of the transmitters. Also for smoother control of the animated character 110, the mechanical joystick returns on the 8-channel PCM transmitters may be removed. In a preferred embodiment, each of these modifications is included.

Each transmitter 310 and 312 includes eight manual control functions for respectively controlling eight RF channels. The single joystick transmitter 310 uses a joystick 314 to provide three analog functions, a sliding toggle switch (CH-5) 316 to provide a binary function and rotational knobs (CH-3 and CH-5 through CH-8) 318, 320, 322 and 324 to provide the remaining four functions. The three analog functions provided by the joystick 314 are implemented using a forward-backward movement, a right-left movement and a rotational movement. The dual joystick transmitter 312 provides two analog functions at each of two joysticks 330 and 332. These two analog functions are implemented using a forward-backward movement and a right-left movement. A sliding toggle switch (CH-5) 334 is used to provide a binary function and rotational knobs (CH-6 through CH-8) 336, 338 and 340 are used to provide the remaining three functions.

Each type of transmitter 310 or 312 also includes a master/slave switch 326 and 328, respectively, which is used to provide simultaneous control between two of the control functions. The master/slave switch 326 on the single joystick transmitter 310, when enabled, allows the sliding toggle switch (CH-5) 316 to act as a master such that it also controls the function of the rotational knob (CH-6) 320, acting as a slave. Similarly, the master/slave switch 328 on the dual joystick transmitter 312, when enabled, allows the sliding toggle switch (CH-8) 340 to act as a master such that it also controls the function of the rotational knob (CH-5) 334, acting as a slave.

An attached appendix illustrates a preferred manner of using the controls of the five PCM transmitters to control the functions of the animated character 110. The appendix includes a "control" column which indicates the knob, switch or joystick being referenced; a "movement" column to indicate the appropriate movement of the "control" device; and a "function" column for each of the five transmitters 222 to indicate the function of the control device movement with respect to the animated character. A "Function No." column is also included to provide a reference for the forty functions. Also, adjacent each "function" column, the particular Futaba servo model number for that function is indicated. References to "right" and "left" animated character body parts in the appendix are provided with respect to the audience facing the front of the animated character. It is noted that while the particular configuration illustrated in the appendix has been found useful, the correspondence between the functions and the controls may be interchanged to implement any one of a number of configurations to suit the desired application.

An additional aspect of the transmitters 222 of FIG. 2 is a mouth driver feature which controls movement to the mouth of the animated character 110 according to utterances or sounds generated by the audio system 212. This is an another important aspect of the present invention as it is used to simulate the mouth movement of a human being during speech. This feature is referred to in the attached appendix where the knob (CH-7) 322 of the first single joystick transmitter 310 is described as being remotely controlled to implement jaw movement on the animated character. An audio line 230, coupling the audio system 212 to the transmitters 222, provides the necessary audio signal to a mouth driver circuit as part of the transmitters 222. The mouth driver circuit is depicted as 400 in FIG. 4a.

In FIG. 4a, the knob (CH-7) 322 and the associated potentiometer 410 of the single joystick transmitter 310 are shown removed from the single joystick transmitter 310, and three signals (+9 v, ground and signal input) are shown in their place. The dotted line 412 illustrates the normal connection of the potentiometer 410 within the single joystick transmitter 310. During normal, unmodified operation, the potentiometer 410 provides a signal input voltage varying between 0 v and 9 v DC. The potentiometer 410 is removed to provide a signal representing the audio signal at line 230 of FIG. 2 which is combined with an adjustment signal to provide appropriate mouth movement for the animated character.

This function is accomplished by using a conventional amplifier 414 to amplify the signal on line 230, via a coupling capacitor 441, to convert the millivolt-range of the signal 230 to a signal range which is between 0 v and 3 v DC. The output of that amplified signal is summed at another amplifier 416 with an offset control voltage (adjustment signal) such that 0 v at the output of the amplifier 414 (0 v at the output of the amplifier 416) corresponds to the mouth of the animated character being closed and 3 v at the output of the amplifier 414 (9 v at the output of the amplifier 416) corresponds to the mouth of the animated character being fully opened. Preferably, the potentiometer 410 is manually controlled such that when the mouth of the animated character is in the relaxed position, the output of the amplifier 416 is about 1 v. For casual conversation and mouth movement, the output of the amplifier 416 does not typically exceed about 3 v.

The resistors illustrated in the circuit 400 may be implemented using potentiometers which are adjusted to provide the amplification set forth above. For example, amplification at the amplifier 414 may be implemented using 10 K-Ohm and 500 K-Ohm potentiometers 420 and 422, respectively; summing at the input of the amplifier 416 may be implemented using 100 K-Ohm resistors 428 and 430; and the feedback path about the amplifier 416 may be implemented using a 100 K-Ohm potentiometer 432. The potentiometer 410, removed from the transmitter 310, is a 5 K-Ohm potentiometer but may be implemented in the circuit of FIG. 4a using a 10 K-Ohm potentiometer. Ideally, the circuit 400 is separately housed in durable structure and coupled to the transmitter 310 using conventional three-wire shielded (three conductor shielded) cabling.

Figure 4B:
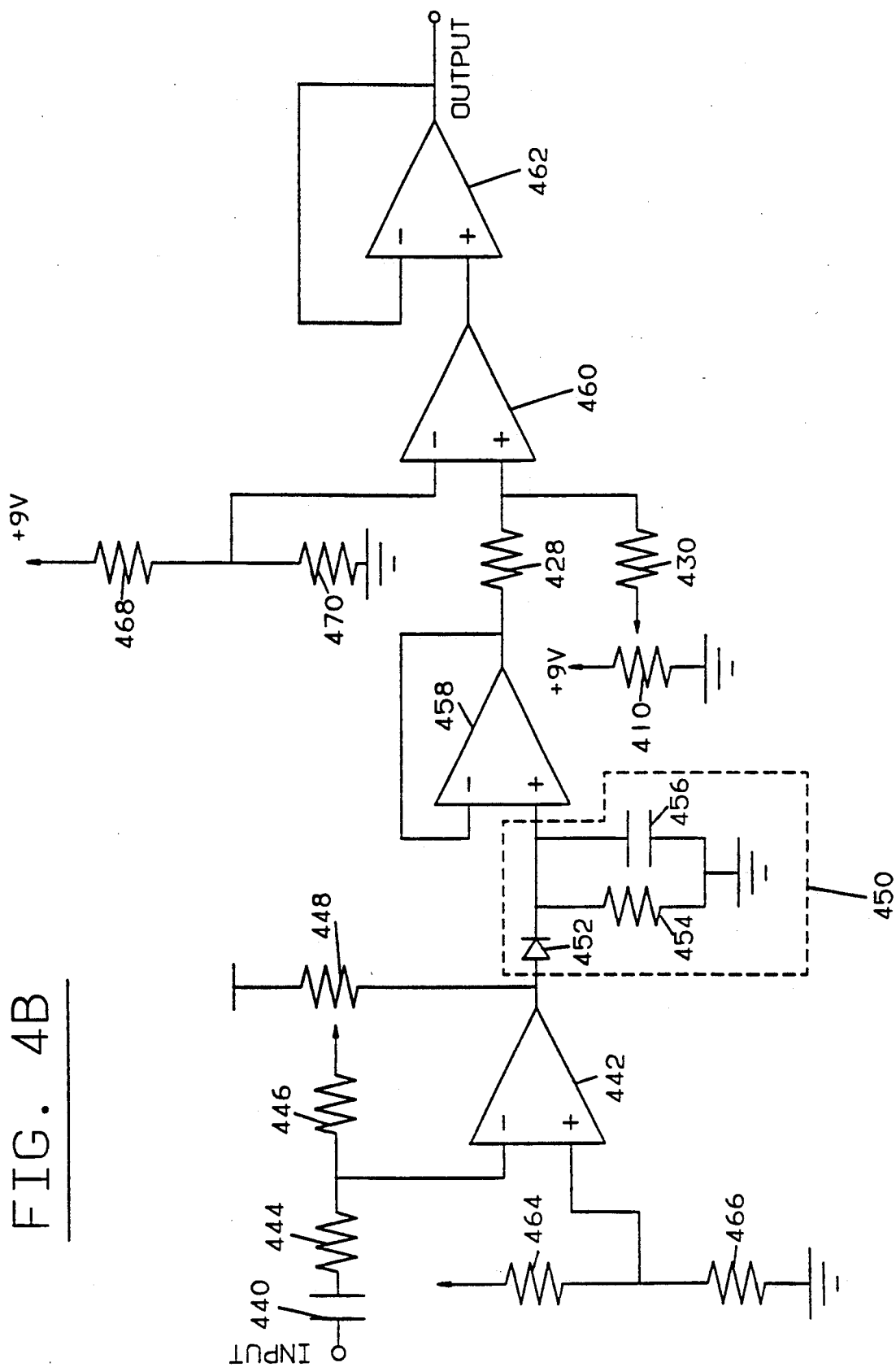
FIG. 4b is a schematic of an alternative mouth driver circuit 400, according to the present invention, also for controlling movement of the mouth of the animated character 110.

In FIG. 4b, an equivalent, alternative embodiment of the mouth driver circuit of FIG. 4a is illustrated. Like the embodiment illustrated in FIG. 4a, this embodiment receives its power (+9 v and ground) from the joystick transmitter 310 and uses the potentiometer 410 as discussed with FIG. 4a. The input signal 230 is coupled to an amplifier 442 via coupling capacitor 440 and amplified using a 10 K-Ohm resistor 444, a 240 k-Ohm resistor 446 and a 250 k-Ohm potentiometer 448. From the output of the amplifier 442, a rectification circuit 450, comprising a diode 452, a 47 k-Ohm resistor 454 and a 1 micro-Farad capacitor 456, couples the amplified signal to an inverting amplifier 458. The output of the amplifier 458 is summed with a control signal provided from the potentiometer 410 using 100 k-Ohm resistors 428 and 430, as described in connection with FIG. 4a. From the interconnection of resistors 428 and 430, an amplifier 460 is used to adjust the level of the signal and an amplifier 462 is used to invert the signal for the joystick transmitter 310. Voltage reference for the amplifiers 442 and 460 may be established using a 1.5 mega-Ohm resistor 464 and a 100 k-Ohm resistor 466 at the positive input of amplifier 442 and 100 k-Ohm resistor 468 and 50 k-Ohm resistor 470 at the negative input of the amplifier 442. Each amplifier discussed in connection with FIGS. 4a and 4b may be implemented using a bipolar LM358N type operational amplifier.

Video And Audio Control

The video system of 214 of FIG. 2 preferably includes a black and white monitor 233 for displaying images received from the remote camera 142, and a color monitor 235 for displaying images received by the video camera (722 of FIG. 7) located within the animated character 110. The remote camera 142 includes a transmitter 232, preferably a Dell Star Model DS-503/1PLL transmitter, for transmitting video signals to a compatible receiver 234, such as a Dell Star Model DS-602A receiver, within the video system 214. Similarly, a Dell Star Model DS-503/1PLL transmitter (724 of FIG. 6) within the animated character 110 may be used to transmit video signals to a Dell Star Model DS-602A receiver 237, within the video system 214. The receiver 234 is electrically coupled to the black and white monitor 233, and the receiver 237 is electrically coupled to the color monitor 235.

The speaker (system) 216 also incorporates a Dell Star Model DS-602A240 receiver 240. The receiver 240 receives RF audio signals from a Dell Star Model DS-503/1-PLL transmitter 242 which carries sounds from the operator and/or audio system 212 to the speaker 216. Other aspects of the speaker (system) 216 are discussed in connection with the audio system 212 of FIG. 5, below.

Figure 5:
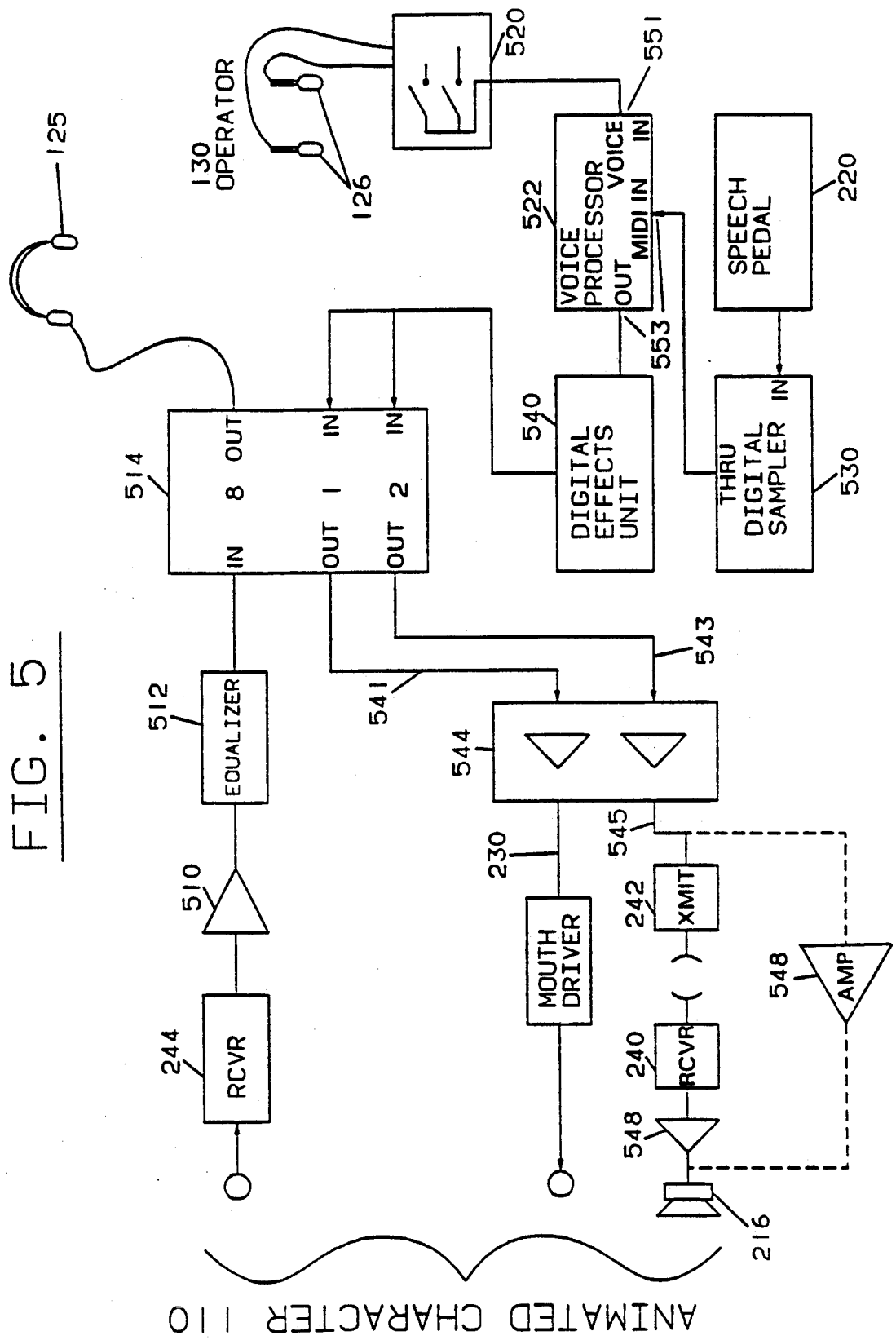
FIG. 5 is a schematic of an audio system 212 of FIG. 2 according to the present invention.

FIG. 5 is a schematic diagram illustrating a preferred manner of operating the audio system 212 of FIG. 2. At the left side of FIG. 5, audio signals provided to and from the animated character 110 are shown, and a control area for the operator(s) (130 of FIG. 1) is depicted at the right side of FIG. 5.

Referring first to the audio path from the animated character 110 to the operator 130, sounds that are picked up by the microphones in the animated character's ears are transmitted to the receiver 244 from which a noise gate 510, preferably a Rocktron Model Hush II C, filters noise below a selected threshold. From the noise gate 510, signals are processed by an equalizer 512 to adjust the audio sound to the operator's liking. The equalizer 512 may be implemented using a 32 band Ibanez GE3101 type equalizer. The equalizer 512 provides a processed signal to an amplifier 514 which then drives the earphones of the headset 125. The amplifier 514 may be implemented using a conventional microphone/line amplifier having multiple amplification paths. For example, a Yamaha MLA 7 which may be used for this purpose includes 8 input/output channels.

Referring now to the audio path from the operator(s) 130 to the animated character 110, microphones 126 may be employed in conjunction with a microphone arbitrator 520 to provide speech utterances to the animated character 110. The microphone arbitrator 520, which is commercially available from Morley Inc., includes switches to select and pass signals from one of the two microphones or from both microphones. This is a useful feature in certain environments where one operator is employed to generate certain types of speech (e.g., jokes), and another operator is employed to provide general or supplemental conversation such as commercial or contracted work.

Speech or sound that is passed through the arbitrator 520 is processed using a voice processor 522 to vary the pitch of the speech generated. Preferably, the voice processor 522 is implemented using a Roland VP-70 voice processing unit which includes a standard voice input port 551 for receiving the audio from the arbitrator 520 and a Midi Data Interface at ports 553 which are designed to communicate with other Midi-compatible units.

The Midi Data Interface is used to intercouple the speech pedal 220, the Roland VP-70 voice processing unit 522, a digital effects unit 540 and a digital sampler 530. The speech pedal 220, as previously discussed, is preferably implemented using a Midi Mitigator RFC-1, which is also Midi-compatible. The digital sampler 530 is used to store digital audio sounds and may be implemented using a Midi-compatible S1000HD, available from Akai, Inc. The Midi Mitigator RFC-1 type speech pedal 220 is designed to select digital samples from the Akai S1000HD digital sampler 530 and to activate programmable functions on the Roland VP-70 voice processing unit 522. Such selection and activation is accomplished using conventional Midi data bus addressing techniques.

The speaking operator must be careful, however, not to speak (unless desired) when a digital sample is being retrieved for execution from the digital sampler 530. This is because the amplifier 514 processor 522 acts as a sound mixer, summing voice from the arbitrator 520 with sound generated by the digital sampler 530.

The digital effects unit 540 receives the output of the voice processor 522 to allow the operator to modify the speech generated therethrough using conventional studio editing techniques. For example, the digital effects unit 540 may be implemented using an SDE 2500 type digital effects unit, available from Roland Inc., to provide such effects as reverb, feedback, time delays and infinite repeats.

The output of the digital effects unit 540 is received and amplified by two channels of the amplifier 514. Being coupled to the Midi interface, the output of the unit 540 may also be modified using Midi data bus coding. The outputs 541 and 543 of these two channels are received by a dual channel noise gate 544, preferably a Hush II C available from Rocktron, Inc., which filters noise below a selected threshold for each channel. At the output 230 of the first channel of the noise gate 544, the mouth driver circuit 400 of FIG. 4a processes the signal to control the mouth of the animated character, discussed above.

At the output 545 of the second channel of the noise gate 544, the audio signal is amplified and passed to the speaker 216 (co-located with the animated character) via a direct or an indirect path. The indirect path includes the transmitter 242 and the receiver 240, as described and illustrated in connection with FIG. 2. An amplifier 548, for example, a Rockford Fozgate Power 300 MOSFET type amplifier, is used to drive the speaker 216 from the output of the receiver 240.

The direct path for coupling the output of the second channel of the noise gate 544 to the speaker 216 includes a hard-wired connection between the noise gate 544 and an amplifier 548, using a Carver 1200 type amplifier, and a second hard-wired connection between the amplifier 548 and the speaker 216. The latter approach is useful in situations where the operator is situated nearby the animated character, and where the interconnection establishing the path will not take away from the animated character's life-like appearance.

Overview Of The Animated Character

Figure 6:
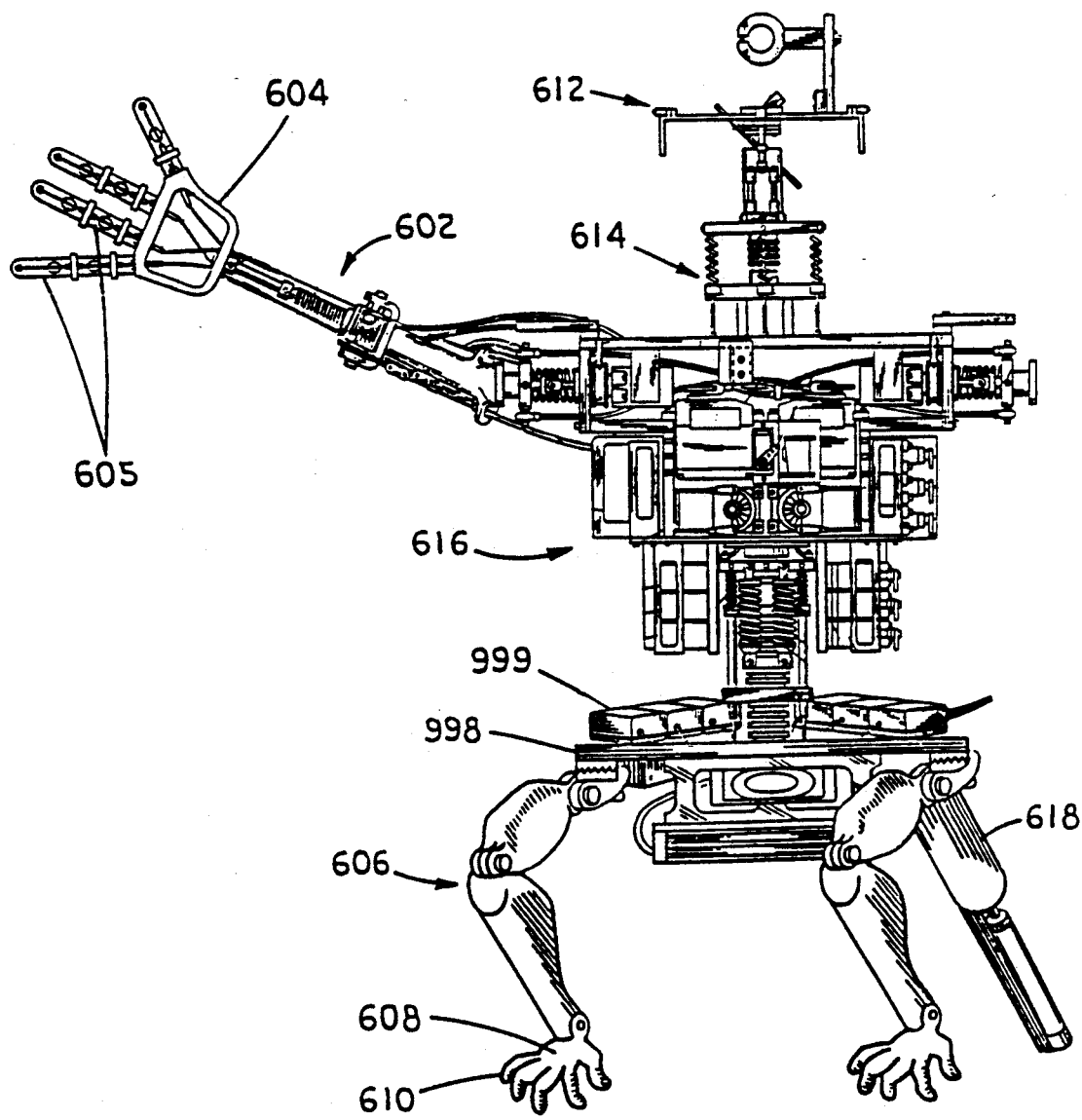
FIG. 6 is an enlarged front view of the animated character 110.

FIG. 6 illustrates a front view of the animated character 110 referred to in each of the previous figures. This view depicts one of two symmetrically designed arms and, to illustrate clearly the components of the animated character, does not show a furry coat which is used allow the animated character to simulate the look of a wild beast. Generally, the animated character 110 has a body that is akin to an canine or human body insofar as it includes two arms 602 with connected hands 604 and fingers 605, two legs 606 with connected feet 608 and toes 610, a head 612, a neck 614, a torso 616 and a tail 618.

The control functions listed in the appendix are implemented within the animated character using eight channel receivers with one of the eight channels coupled and dedicated to associated servo-mechanisms ("servo"). Each servo is used to implement one of the functions listed in the attached appendix. Interconnections between each servo and its associated receiver includes a three wire connector carrying power, ground and the received signal. The receiver associated with the respective servos are preferably Futaba 8-channel PCM receivers. A preferred type of servo for each function is the Futaba digitally proportional type servo, and its specific model number for the associated function is listed in a separate column in the appendix next to the associated function. Thus, forty functions are implemented using five 8-channel PCM receivers.

The servos include two types: direct drive servos and indirect drive servos. The direct drive servo is the least common type. It is found only in the neck, waist and shoulders, and is employed when the location of the servo is best suited at the location of the actual action. The direct drive motion is always expressed as rotational force.

The second and most common mechanism is the indirect drive servo which allows the servo to be located away from the point of motion to minimize the effects of the inertial forces. The indirect drive servo uses a cable coupled to the output shaft of the servo to exert a rotational push-pull force or uses one or more cables coupled to a point on the output shaft of the servo to exert a linear force. Both types of forces are generated by a slight rotation of the servo output shaft.

Figure 14:
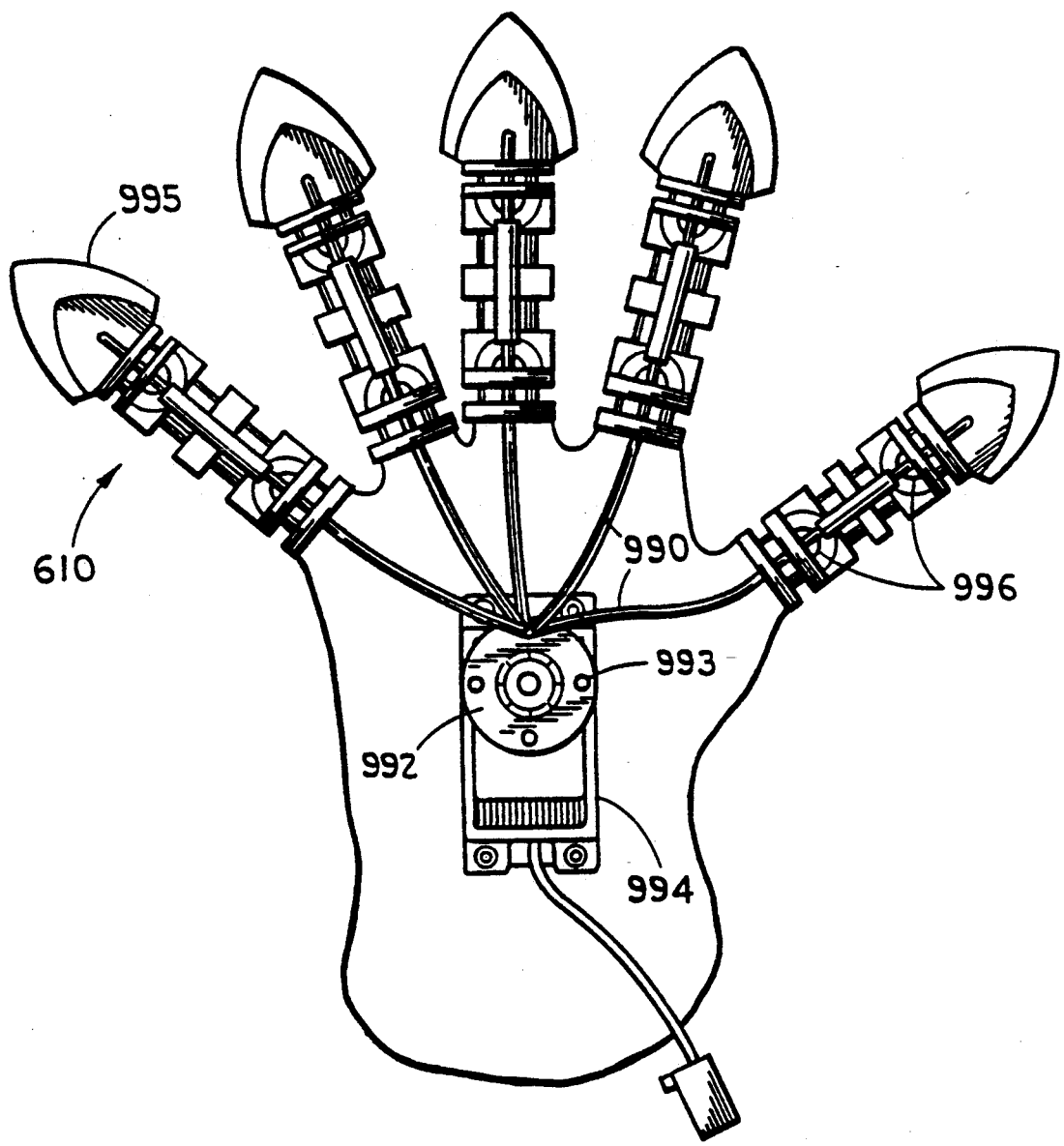
FIG. 14 is a bottom view of one of the feet of the animated character 110 of FIG. 1.

An example of a linear force provided by an indirect drive servo is illustrated in FIG. 14 wherein cables 990 are pulled toward the heel of the foot in response to a slight rotation at the output shaft 992 of the indirect drive servo 994. The cables 990 are preferably tied to the output shaft 992 at point 993 rather than where they are shown to be tied. This avoids slack in the cable 990 to the toes 610 when the output shaft 992 rotates clockwise. The toes 610 return to their relaxed position when the cable releases due to the action of return springs 996 in each of the toes.

Another example of a linear force provided by an indirect drive servo is illustrated in FIG. 9 where a lever 1101 is mounted to a servo 832 to pull a cable 839 in cable guide 433. The cable 839 is connected to the lever 1101 using an adjustable line clamp 1103 and a KWIK-LINK type connector 1105. The line clamp 1103 and the connector 1105 are all available from Royal Distributors, Inc. of Englewood, Colo. This type of indirect drive servo, using such a lever 1101, is used for the wrists, fingers and facial functions.

Figure 10A:
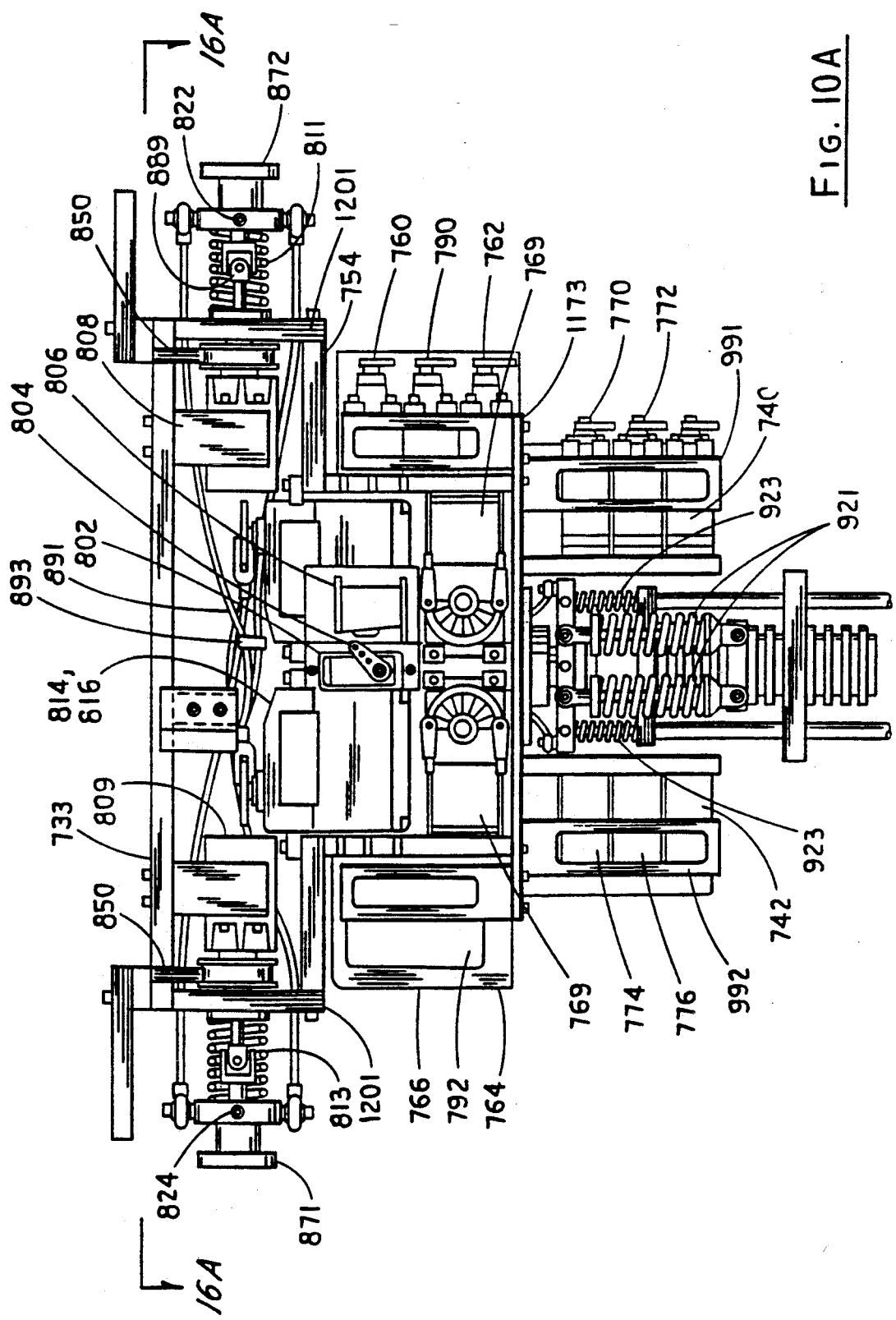
FIG. 10a is a front view of the torso of the animated character 110 shown in FIG. 9.
Figure 10B:
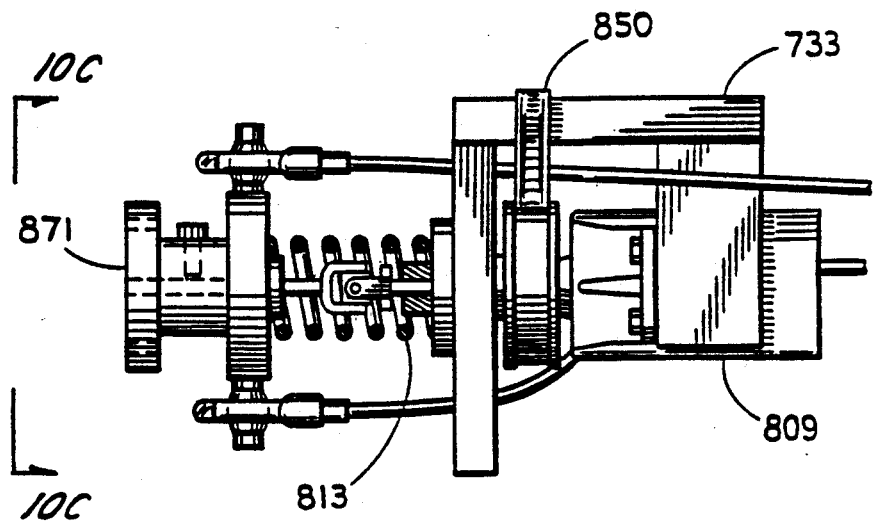
Figure 10C:
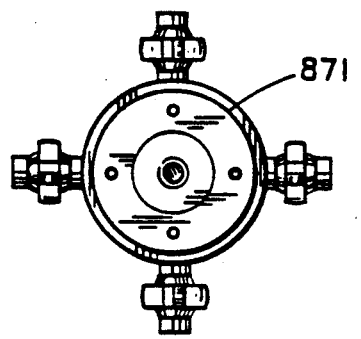
Figure 10D:
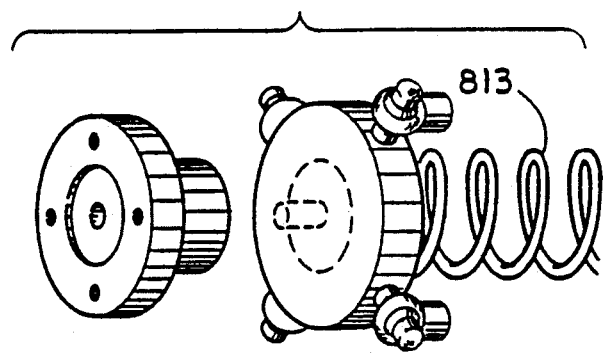
Figure 10E:
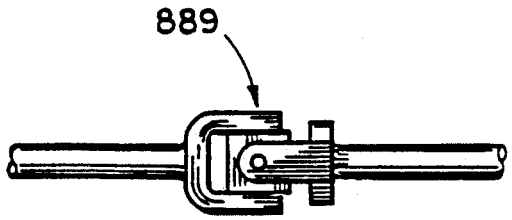

An example of a direct drive servo rotational force is illustrated in FIGS. 10a and 10b wherein a shoulder servo 808 or 809 is shown configured to drive directly without cables an arm 602 which attaches thereto at mount 871 or 872.

All cables are composed of steel, brass coated steel and/or nylon fishing line of about 25 lb. strength. While the nylon line is preferred due to its lighter weight, brass cable is used to avoid cable stretching in longer cable applications such as between servos in the chest cavity of the animated character and its elbows and fingers. Also, wherever brass cable would contact metal, nylon cable is used. Thus, in certain instances, such as the arm, a cable comprises one or more brass sections and one or more nylon sections. These sections may be joined by a simply constructed cable junction clamp including a bolt screwed into a tapped aluminum cable receptacle. Typically, both types of cables are carried in cable guides which are composed of hard nylon or plastic tubing. The cables guides and the brass cable itself are available from Southerland, Inc.

Figure 16A:
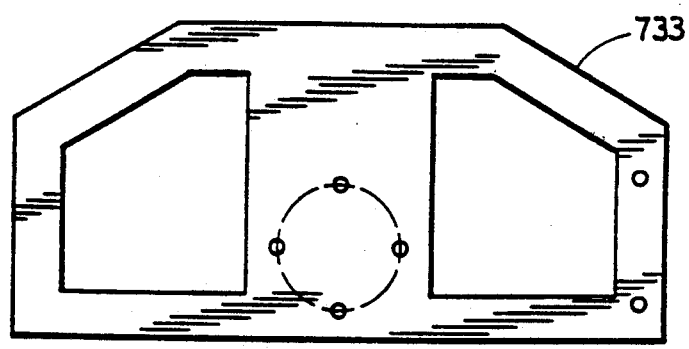
Figure 16B:
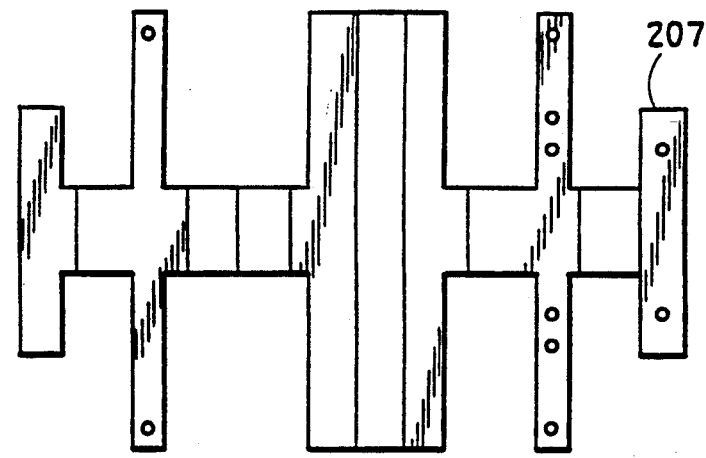
FIG. 16b is a front view of a plate 754 depicted along line 16b in FIG. 9.
Figure 16C:
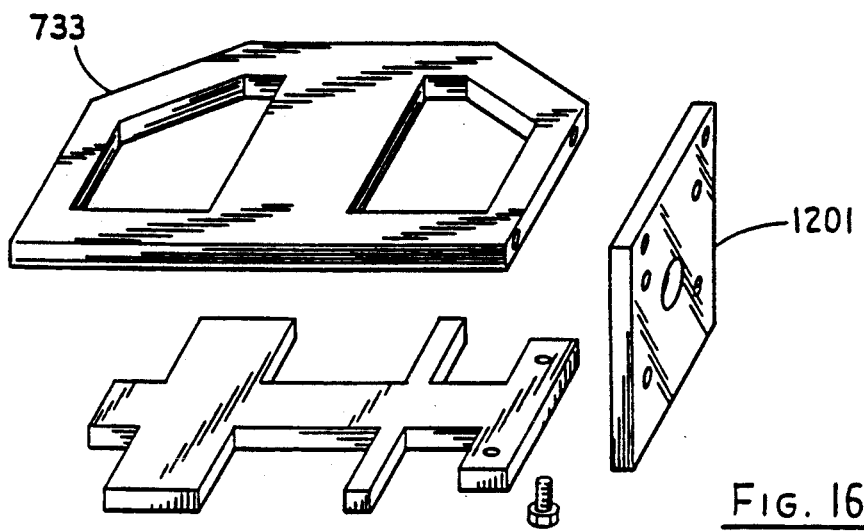
FIG. 16c is a perspective view of the assembly of the plates 733 and 754 illustrated in FIGS. 16a and 16b.
Figure 17B:
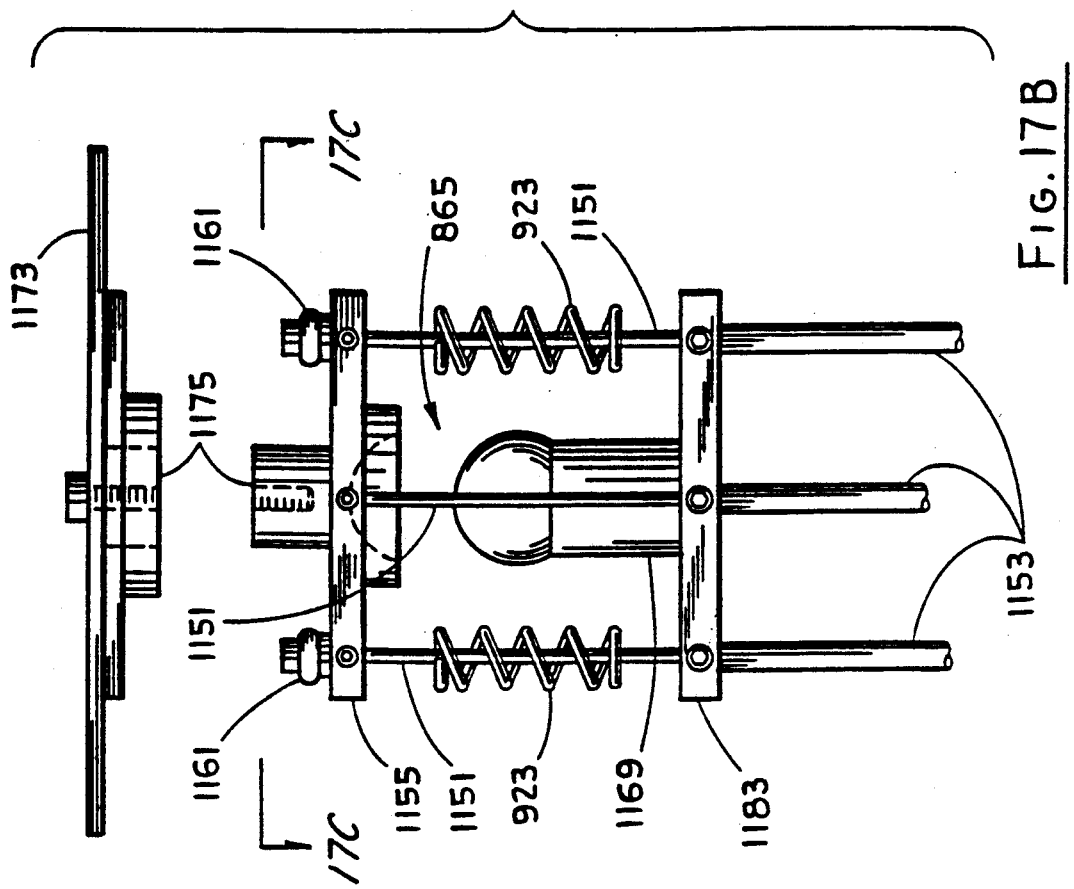
FIG. 17b is another front view of the waist control mechanism of the animated character 110 of FIG. 1.
Figure 17A:
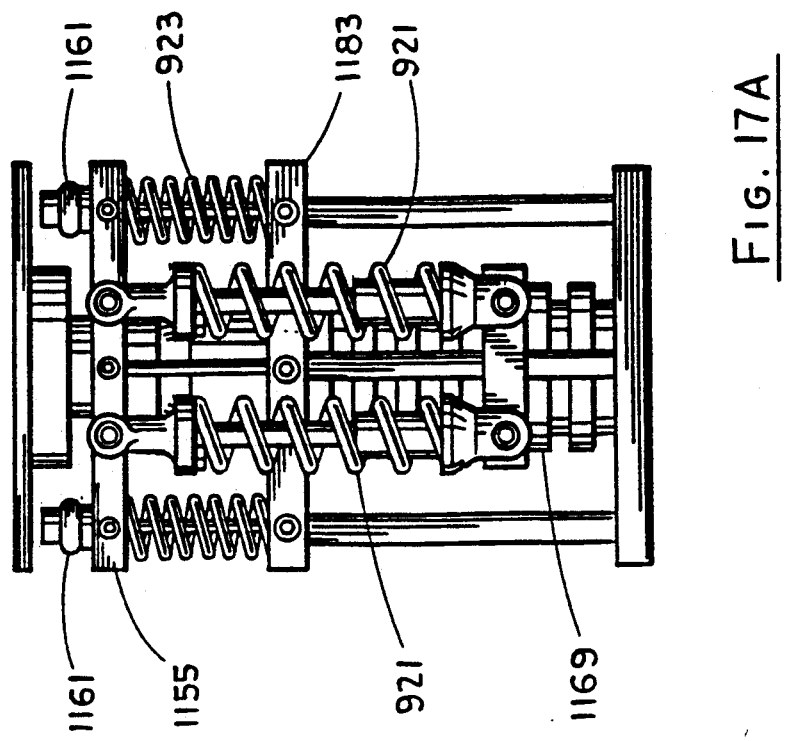
FIG. 17a is a front view of the waist control mechanism of the animated character 110 of FIG. 1.
Figure 17D:
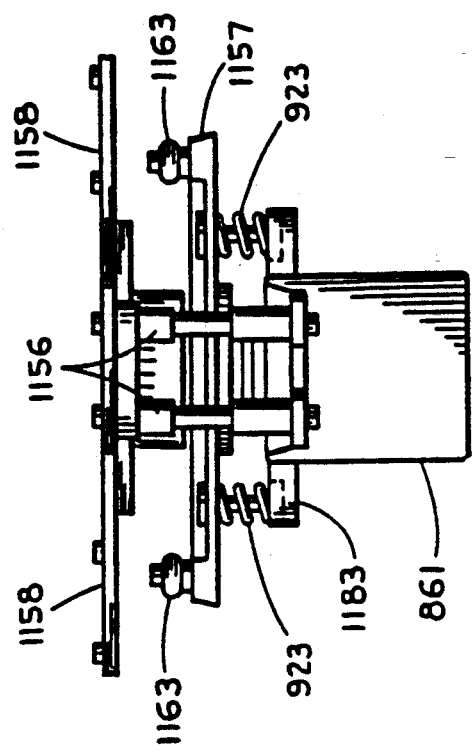
FIG. 17d is a rear view of the waist control mechanism of the animated character 110 of FIG. 1.
Figure 17C:
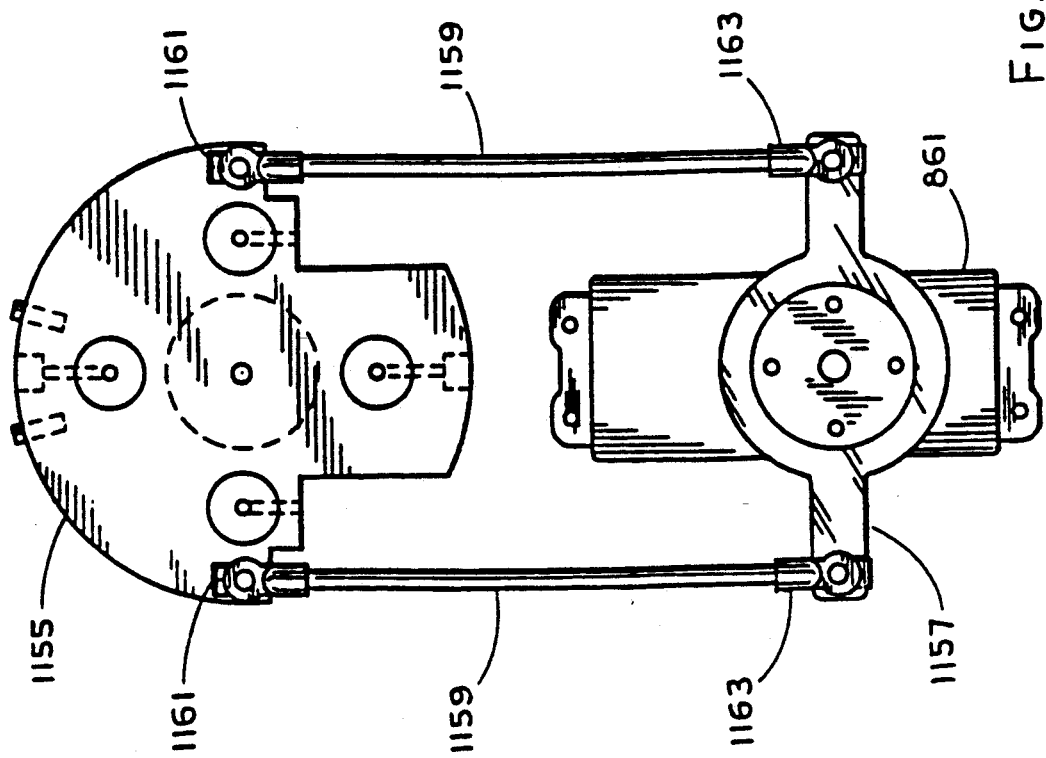
FIG. 17c is a diagram illustrating a top view of the waist control mechanism of the animated character 110 of FIG. 1.

The support structure of the animated character comprises a number of components which are almost exclusively made from hard aluminum with strength adequate to support various staple devices rigidly, including the Futaba servos and receivers previously discussed. For example, in FIG. 16, the aluminum chest cavity, comprises an upper plate 733 and a lower plate 754 to mount the servos, and a shoulder plate 1201, and may be implemented using ¼" solid aluminum, type 6061T6. This type of aluminum is preferably hollowed wherever possible to reduce the overall weight of the animated character.

The support structure includes conventional mounting and clamping means, such as machine bolts and brackets, for mounting these devices. For example, in FIGS. 6 and 12, the structure includes a base plate 998 for bolt mounting all RF receivers, including the five eight-channel receivers 999 and two indirect drive servos 862 and 863 for controlling the waist. The receivers and servos include mounting means to accommodate this type of mounting.

In the discussion that follows, reference should be made to FIGS. 6–17c for the anatomy of the animated character and to the appendix which lists the various types of controls and functions.

Core Of The Animated Character

Figure 7:
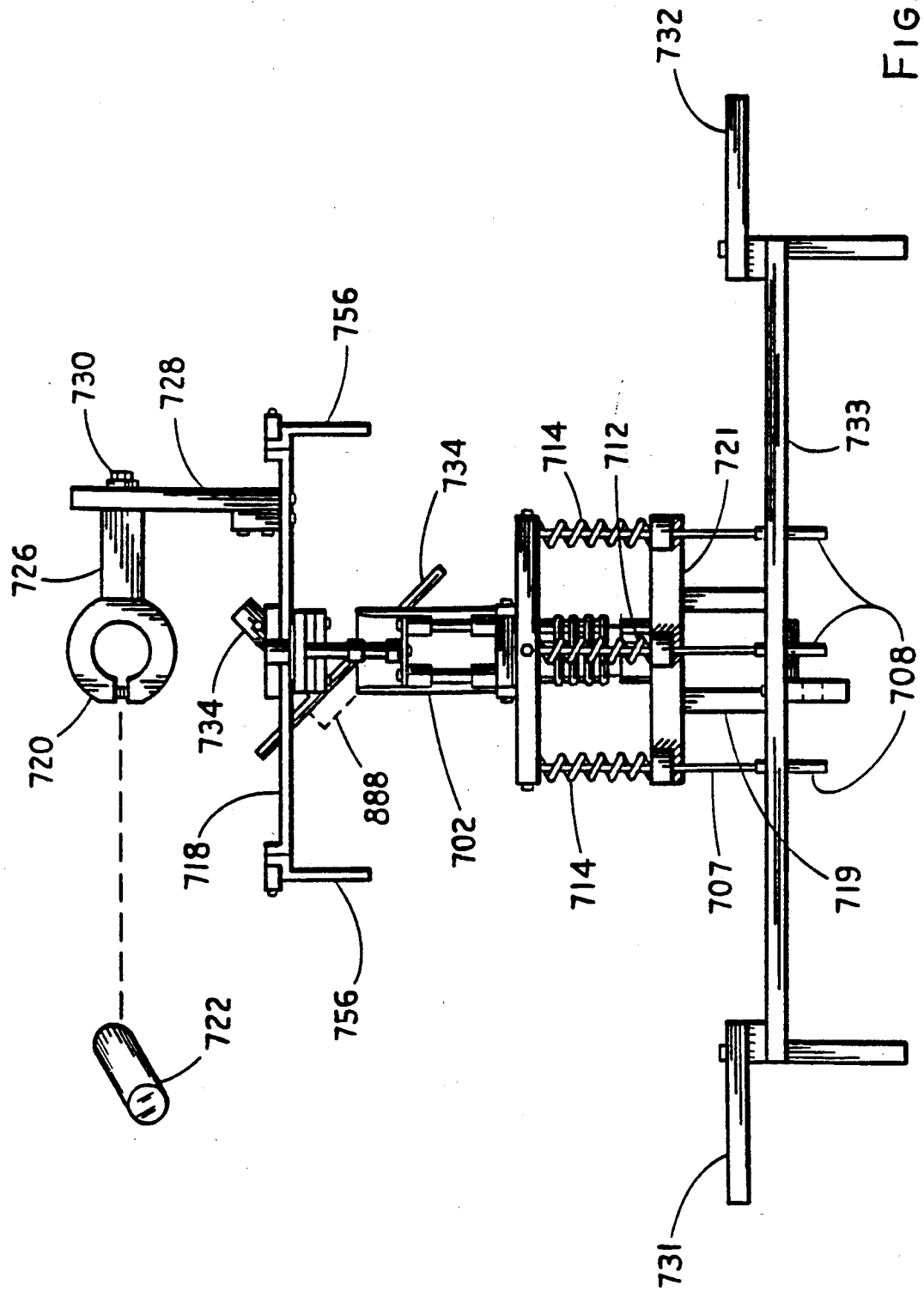
FIG. 7 is a front view of the animated character 110 of FIG. 1 from the shoulders up.
Figure 8A:
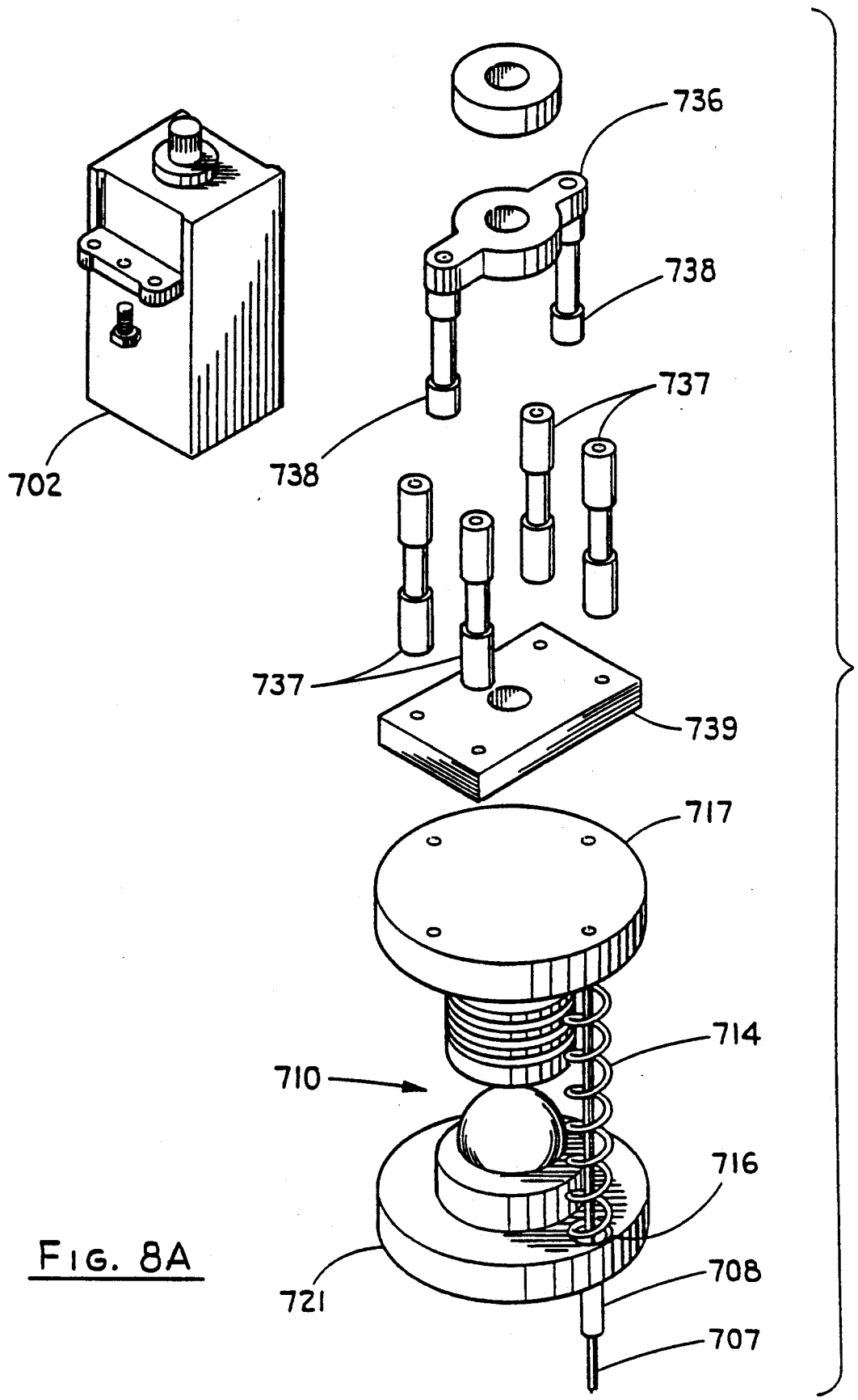
FIG. 8a is a perspective, constructional view of the neck and head structure of the animated character of FIG. 1.
Figure 8B:
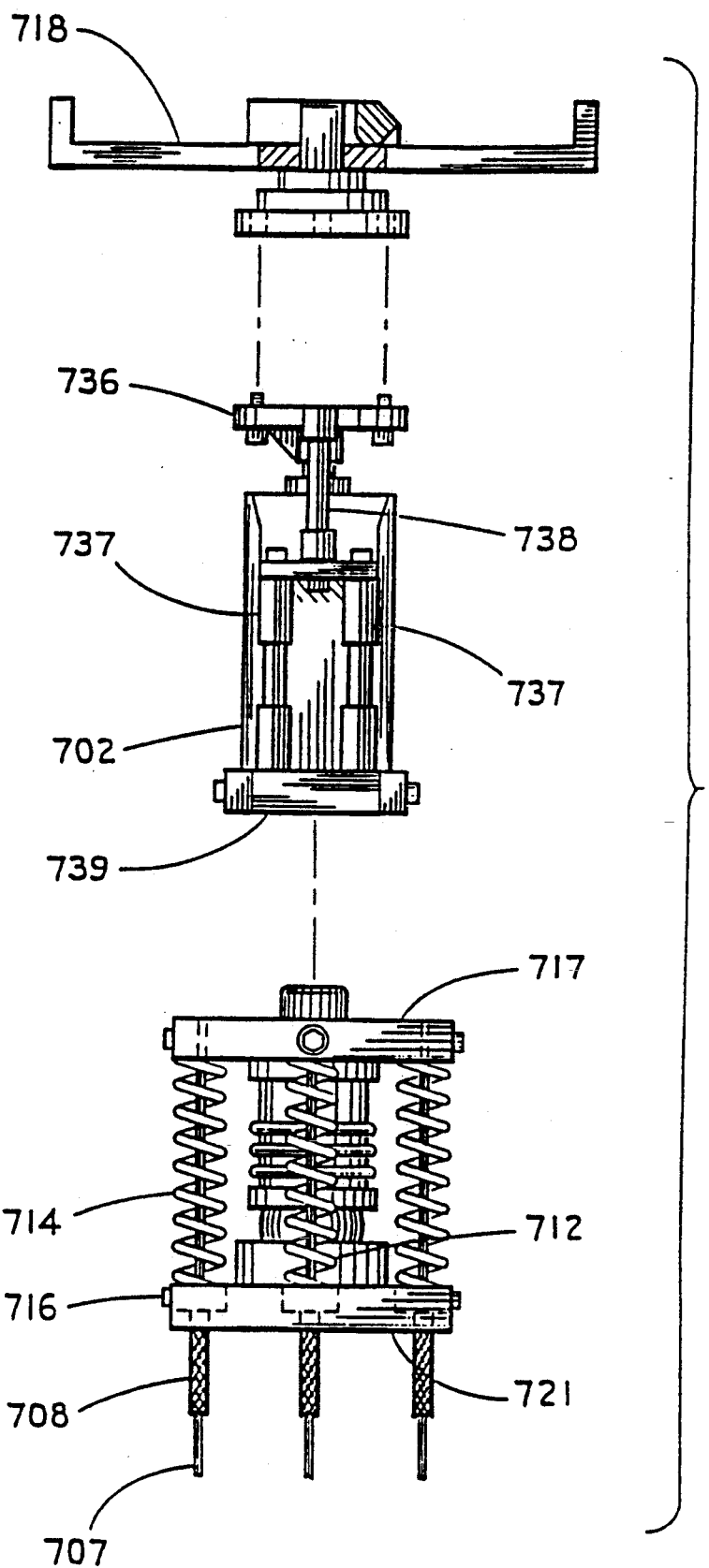
FIG. 8b is a front, constructional view of the neck and head structure of the animated character of FIG. 1.

Referring now to FIGS. 7, 8a and 8b, the neck and head structure for the animated character 110 is illustrated. There are three neck/head control functions, and they are listed as function numbers 1–3 in the appendix. Thus, these functions include tilting the head to the right and to the left, nodding the head up and down and rotating the head about the neck.

The three servo mechanisms used to implement these functions include one direct drive servo 702 for head rotation, and two indirect drive servos 704 and 706 for tilting the head from front to back and right to left. The servos 704 and 706, which are mounted as shown in FIG. 9, control a ball and socket joint 710 that supports movement of the head in any direction up to 60° off center line. Cables 707 from the two indirect drive servos 704 and 706 are shielded and carried by four cable guides 708 spaced at 90° intervals around a plate 733 and a plate 721 to allow the head to tilt forward and backward and right and left, exerting compression on the associated springs 712 and 714. Aluminum support spacers 719 (FIG. 7) are used to separate the plate 721 from the plate 733.

The ball and socket joint 710 is unevenly spring loaded to compensate for gravity and secondary motion caused by inertial forces resulting from head movement. A front spring 712 has a larger spring constant than the other three neck springs 714 (rear spring 714 is not visible from the front view) to compensate for the center of gravity on the head being in front of the neck mount. The ball portion of the joint 710 may be manufactured using hard plastic or acrylic, e.g., nylon or Delron, and the socket portion of the joint may be implemented using aluminum.

The head rotation servo 702 is supported by a servo support plate 739, which provides a base for the servo 702, and by a tiered servo mount structure 736. The servo 702 is bolted to two upper aluminum spacers 738 and into four lower spacers 737. The two upper aluminum spacers 738 are bolted to the servo mount structure 736, and the four lower spacers 737 are bolted to the support plate 739. The support plate 739 is bolted to a ball and socket joint plate 717, which moves about the ball portion of the joint 710 in response to the remote signals (via the servos 704 and 706) controlling the cables 707, to allow the head and neck of the animated character, i.e., from plate 717 to the top of the character's head, to tilt in any desired direction.

In addition to providing a base for the support plate 739, the plate 717 is used to retain and slightly compress the springs 712 and 714 on their topside. On their lower side, the springs 712 and 714 are held in place by aluminum spring retainers 716. The rotation of the head about the neck operates over a 140° span. When combined with the motion of a similar waist mechanism, this structure allows the animated character to position its head to look at anything in the perpendicular plane directly in front of it.

FIG. 7 also illustrates the clamping ring 720 for the color camera 722, preferably a Panasonic GPCD-1 color camera which is most often found in industrial or medical applications. However, this type of camera is especially useful in the present application, because its relatively small camera lens is separate from its video signal processor. This allows the camera lens to be located at the base of the forehead of the animated character and the larger aspect of the camera, the video signal processor, to be disposed when there is more room; namely, within the animated character's buttocks.

The animated character's vision is provided through a small orifice at the base of its forehead, where images are perceived by the camera lens and, after being processed, are transmitted using a Dell Star transmitter mounted under the base plate 998 (FIG. 6). The transmitter for the color camera 722 is depicted as 724 in FIG. 6, and the color camera's video signal processor is hidden behind the transmitter 724. The clamping ring 720 is rotatably adjustable on rotation bar 726 and vertically adjustable as camera mount 728. A bolt 730 may be loosened to provide both rotation and vertical direction type adjustments to the clamping ring 720.

FIG. 7 also illustrates a jaw servo mount 734 which is used to mount the jaw servo 888 of the animated character, and its shoulders 731 and 732 which are separated by the plate 733.

Esthetics Of The Animated Character

FIG. 15 illustrates the skull of the animated character and its control mechanism. The skull includes the typical features of a canine or bear, but the face of the skull is hairless (furless) and has a tough leather appearance. This appearance is realized, in accordance with the present invention, by using a composite of materials including Spandex® cloth, latex rubber and powder (e.g., baby powder or corn starch). The latex rubber is preferably an ammonia based liquid compound such as KWIK-MOLD, available from Adhesive Products, Corp.

The face (or skin) of the skull is manufactured in a manner which may also be used for the hands, arms, legs and feet. The first step in preparing the skin is to cut and sew a cloth material, such as an elastic Spandex® cloth, such that it fits over a body part mold. The body part mold, for example, the face or hands, may be sculptured using a thermo-plastic, such as "Friendly Plastic" provided by Friendly Plastic, Inc. The prepared cloth is then sprayed with a liquid latex rubber (e.g., KWIK-MOLD) until the pores of the cloth are sealed. After the rubber dries, multiple coats of the same latex, but in colored form, are air brushed onto the side to be used as the outside skin. Depending on the desired look of the face, the air brushing and drying takes about 3-4 hours.

Just before the rubber dries or cures, a thin layer of powder may be applied. When the rubber dries, the powder is absorbed into the rubber to give it a rough-looking finish. Preferably, about 20 coats of the colored rubber are applied with powder sprinkled onto the face about every 3-5 coats. The end result is a life-like, rough-looking skin that is flexible to allow for wrinkling.

Variations of the above process may be implemented to accommodate different body components. For example, a preferred embodiment for facial skin includes using the above composite in only four areas that require a wrinkling action: between the eyes; on the bridge of the nose and under each eyebrow. The remaining areas of the skin, including the lips and eyelids are composed of plain latex rubber. The plain latex rubber skin may be previously formed by dipping the body part mold, as described above, into the rubber and allowing the rubber to dry directly on the mold. The skin may then be peeled off and/or cut and patched with the other wrinkling-type skin.

The eyeballs, the teeth and the nose of the animated character may be implemented using conventional taxidermy parts and techniques.

The skull itself is molded into a hollow shape using thermo-plastic, such as Friendly Plastic. The hollow inside of the skull is designed to fit over the color camera 722 and the head mount bracket 718 (FIG. 7). Brackets 756, bolted to the head mount bracket 718, include a plurality of holes to receive bolts for securing the skull at one of several different levels. In the preferred embodiment, the legs and the feet are manufactured in the same manner as the skull; of course, with the requisite structural differences.

Facial Control Of The Animated Character

The motion of each ear of the animated character is controlled by two dedicated indirect drive servos 740 and 742 (servo 742 is not shown but its position is indicated) in FIG. 10a. The associated function numbers in the appendix for the ears are 12 and 16. In FIG. 15, each ear is implemented as an ear paddle 744 which is glued to the skull of the animated character via a small spring 746 having a large spring coefficient. The spring 746 is stiff enough to impede secondary motion but weak enough to allow the servos 740 and 742 to control the motion of the ears without strain.

All cable guides are preferably glued to their supporting structures, and all cables are glued, and if possible sewn, to the targeted structures. Cables 748, which are used to control the ear paddles 744, may be implemented using a strong nylon line (e.g., 100 pound test) to extend the mean replacement time of the cable. Cable guides 749, secured to the skull, carry the cables 748 to the ears. The normal relaxed position of the ear paddle 744 is with the ear spring 746 situated perpendicular to the top of the skull.

Full translation of the ear is about 100°. Although the primary purpose for the motion of the ears is aesthetics, proper design of the ear itself will allow the operator to effectively determine if the source of a particular sound is coming from behind or in front of the animated character. For this reason, independent microphones 753 are clipped to each ear to allow the operator to differentiate right and left sources of sound.

The microphone signals produced from the microphones 753 are automatically adjusted for the ambient noise level by the Dell Star transmitter 724 and then transmitted as a sub-carrier of the color camera's video signal using the transmitter 724 (located in the tail 618). The microphones 753 can be operated on separate channels or together as a single audio path.

The eyelids 758 of the animated character are controlled by independent indirect drive servos 750 located inside the skull (shown in dotted lines of FIG. 15). In the appendix, the function numbers associated with the eyelids are 5 and 6, and those associated with the eyebrows are 17 and 19. Control for each eyelid includes a brass frame 831 molded to the end of the skin of each respective eyelid and a cable 833 guide which is secured to the skull such that a cable 835 pulls/pushes the brass frame 833 around the eyeball 752. Each eyelid is backed with foam to hold lubricant that keeps the eye clean and moist looking.

The upper face employs four indirect drive servos 760, 762, 764 and 766 (FIG. 10a) to control small sections of skin. One section of skin is between its eyes, one section of skin is on the bridge of its nose and one section of skin is under each eyebrow. In the appendix, the function numbers associated with these skin sections are 17 and 19 (eyebrows), 18 (nose) and 20 (between eyes). These servos employ a cable technique that is different from the other cable techniques previously discussed herein. In the previously discussed techniques, the cable guide remains stationary and the cable moves back and forth to control the moving body part. Unlike that previous technique, for the cables associated with these four skin sections, an internal cable 755 is fixed to the face (skin) and a cable guide 757 is responsible for creating the motion of the skin section. The cable guide 757 moves within an external, secondary cable guide 759 which is secured to the skull. When these cables are contracted, the skin between the secured cable guide and the fixed cable will become wrinkled. These contractions "wrinkle" the skin over the nose, between the eyes and over the eyes. When the servos relax, the skin flattens. This cable/guide cable technique is an important part of the present invention and is useful for creating a variety of facial expressions on the animated character.

Four indirect drive servos 770, 772, 774 and 776 (FIG. 10a) are used to control the movements of the upper lips at two positions 778 on each side of the face. The lower lips are stationary. These four servos 770–776 are mounted in the top and center positions servo support structures 991 (FIG. 10a). Each of these control functions, indicated as function numbers 4, 8, 14 and 15 in the appendix, use cable guides 801 sewn and glued to the skull, and the associated cables 803 molded into a plastic attachment 805 that adheres to the lip. The upper lip is preferably thicker than the rest of the face so that its weight will return it to a relaxed position. These four controls to the upper lip of the animated character allows the mouth of animated character to express a full range of emotions.

The jaw movement of the animated character, indicated as function number 7 in the appendix, operates in proportion to the audio amplitude level as described in connection with the mouth driver circuit of FIG. 4a or FIG. 4b. In FIG. 15, the jaws are shown controlled by the cable mechanism mounted therein. As the audio amplitude level increases, the servo contracts a cable 807, having an associated cable guide 809 secured to the skull, thereby pulling back on an actuator rod 811 (as shown in FIG. 15) to pull the upper jaw away from the lower jaw. The rod 811 is pivotally connected via right and left hinges (815) to a conventional cable link 813 and to plastic jaw plugs 815 which are molded to the upper and lower jaws. When cable 807 retracts, the rod 811 draws the upper jaw plug 815 and the upper jaw up to open the animated character's mouth about a pivot point where the jaw plugs 815 interconnect. The rod 811 is secured to the lower jaw via a plate 817 which is also molded into the lower jaw.

Control of the tongue, as indicated by the function numbers 22 and 23 in the appendix, involves movement of cables 817 in guides 819 to pull the tongue to either side of the mouth. The base of the tongue and the cable guides 819 are secured to the rear area of the lower jaw. The servos 790 and 792 for the tongue are illustrated in the upper servo banks of FIG. 10a. These servos control the tongue in the following manner: (1) when one cable 817 is contracted (pulling), and the other cable 817 is extended (pushing), the tongue will protrude to one side of the mouth; (2) if both servos are contracted, the tongue will contract into the back of the mouth; (3) if both servos are extended, the tongue will be extended. Some up and down control of the tongue is possible depending upon the order of contraction.

The tongue may be molded out of a highly flexible thermo-plastic to provide a life-like appearance. For example, the tongue may be made by melting plastic fishing worms and then molding the worms to the desired tongue shape.

Each of the above facial movement features may be disabled by putting the animated character in a sleep mode, as indicated by function number 21 in the appendix. The sleep mode is enabled by a servo 802 that rotates a lever 804 to engage a multi-poled microswitch 806 (or a plurality of piggy-backed micro-switches) which shut off power to the other four 8-channel receivers 999 and to the transmitter 724 (FIG. 6) for the color camera. When asleep, this feature conserves the power supply in the animated character while maintaining control of all eight functions (function numbers 1–8 of the appendix) of the associated 8-channel receiver 999, including eyelid control; thus, while in the sleep mode, the animated character is able to open its eyes as though it was waking up. The micro switch 806 may be implemented using one or more conventional momentary micro switches available from Archer, Inc.

Control Of The Arms

Figure 11A:
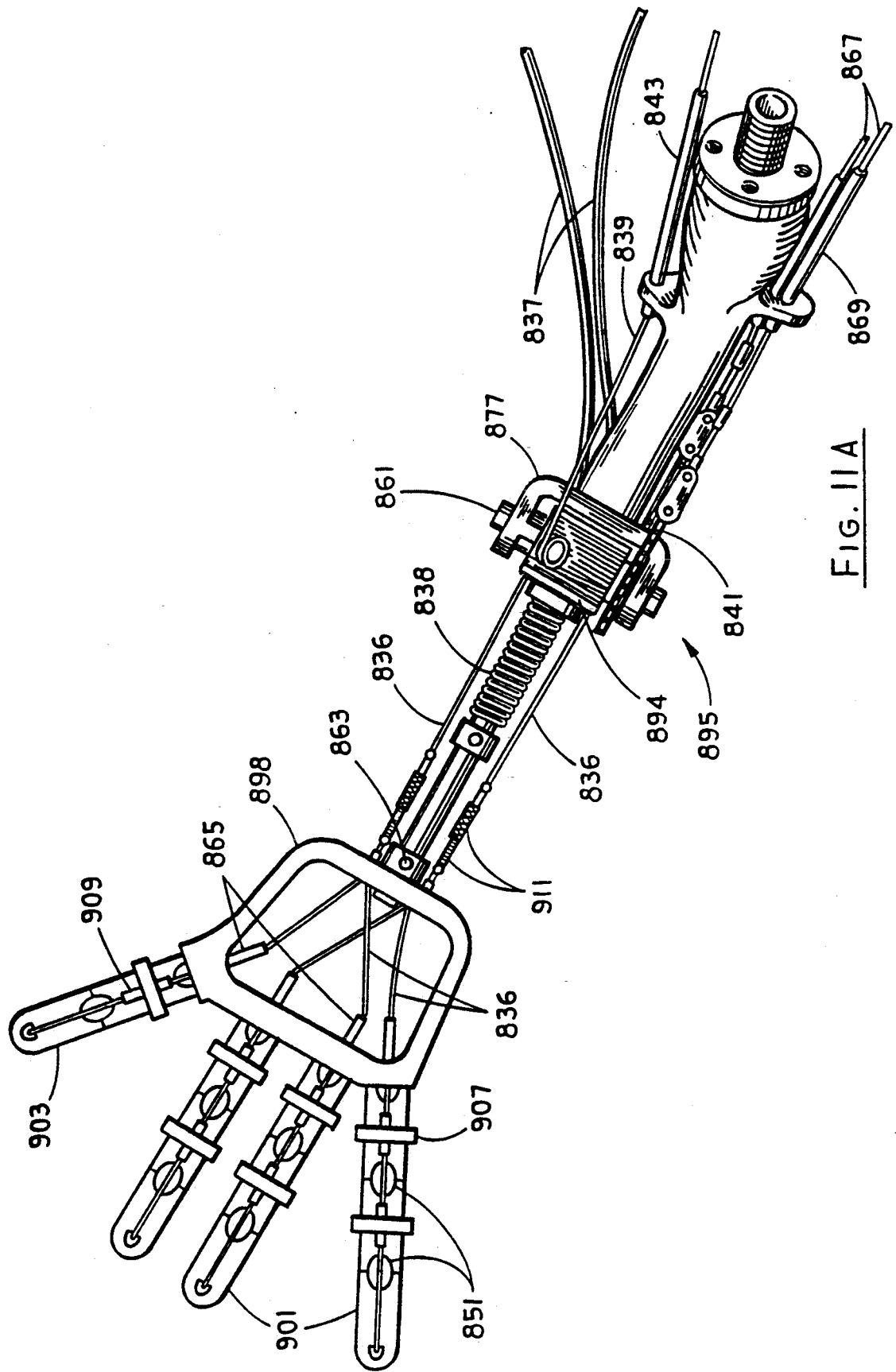
FIG. 11a is a perspective view of an arm and a hand of the animated character 110 of FIG. 1.

The arm 602, which is illustrated in FIG. 11a, can be raised by rotating the arm upward or by lifting it at the shoulder. A shoulder rotation movement is performed using a direct drive servo 808 (FIG. 10a) which is mounted at the shoulder and coupled to the arm. This direct drive servo implementation can rotate the arm 140° from the home position. The rotation is aided by surgical tubing 850 mounted on the plate 733 to help counteract the forces of gravity on objects held in the animated character's hand (FIG. 5). The arm is preferably made of aluminum and includes an aluminum U-shaped elbow bracket 877. The arm is mounted to the drive servo 808 at mount 872 via a spring loaded universal joint 811, so as not to inhibit the function of the shoulder. The arm also has mounts 861, 863 and 865 for the elbow, the wrist and the finger cable guides, respectively.

The elbow is driven by a dual cable 867 in cable guides 869. Indirect drive servos 769 (FIG. 10a) provide control for each elbow. The cable 867 is attached to a small adjustable plastic chain 841 which drives a sprocket (underneath the chain). The sprocket is attached to the forearm (see FIG. 11). The elbow can rotate 90° plus some, and the home position can be adjusted mechanically or trimmed by the control device remotely. The sprocket and chain assembly may be implemented using conventional parts available from Serv-O-Link of Euless, Tex.

Control Of The Shoulders

In FIG. 10a, the shoulder functions are shown to include three servos for each side; one direct drive servo 808 or 809 for rotation, and two indirect drive servos 814 and 816 or 818 and 820 for front to back movements and for up and down movements. These functions are listed in the appendix as function numbers 25 (33), 27 (35) and 28 (36) and operate in substantially the same manner as the neck and waist, with two sets of push/pull cables connected to four points of each shoulder. Servos 816 and 820 (which control the shoulder at points 822 and 824) are mounted behind the servos 814 and 816 and are therefore not shown. As illustrated more clearly in FIGS. 10b and 10e, these servos control a single universal joint or "U-joint" 889 that supports movement in any direction up to 45 degrees off centerline.

The universal joint 889 provides any combination of up and down, and front to back movements up to 45 degrees. The universal joint is evenly spring loaded via spring 811 or 813 to keep tension on shoulder cables 891 at all times. A plastic retainer 893 is used to retain the cables 891 adjacent one another.

Control Of The Wrists

FIG. 11a illustrates the animated character's wrist control. This control is accomplished using an indirect drive servo 832 or 834 located in the top position of the back servo banks (FIG. 9). A 100 pound (test line) cable 839 is fed from a guide 843 mounted on the arm to control a rotation return spring 838. The end of the cable 839 is secured to a drum (or spool) 894 in the elbow 895 at the rotation axis 861. When the servo 832 or 834 contracts the cable 839, the wrist rotates against the force of the spring 838. When the servo 832 or 834 is in the relaxed position, the spring 838 returns the wrist to the relaxed position.

Control Of the Hands And Fingers

FIG. 11a also illustrates the animated character's hands 604 which include three semi-independent fingers 901 and an opposing thumb 903 (generally "fingers"). Each finger includes a plurality of acrylic tubular sections 905 with a return spring 851 linking them together and connecting them to the palm. The sections 905 form joints therebetween so as to allow bending in the proper direction upon contraction of cables 836; the cables acting as finger tendons. The fingers include multiple pieces, each piece composed of acrylic nylon and comprising a plastic ring 907 and a section 905, to secure the cable guides 909 to the outside surface of the sections 905 on the inside of the hand.

The fingers are controlled in pairs (different fingers are controlled together on opposite hands) to give the illusion that each finger is independently controlled. Most human gestures can be generated between the two hands. Indirect drive servo 856-859 located in the back of the servo banks (FIG. 9) control the cables 836 to each pair of fingers. Cable guides 837 for the cables 836 are secured to the arm behind the elbow and include a break point at cable clamps 911 for adjustment.

Figure 11C:
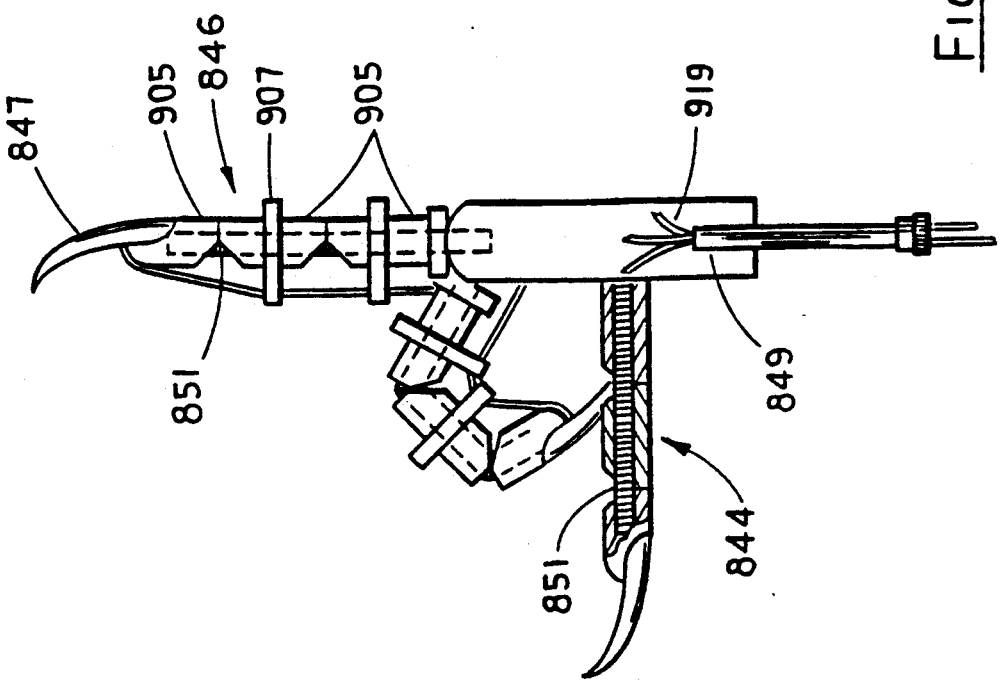
FIG. 11c is a side view perspective of the hand/wrist arrangement shown in FIG. 11 B.
Figure 11B:
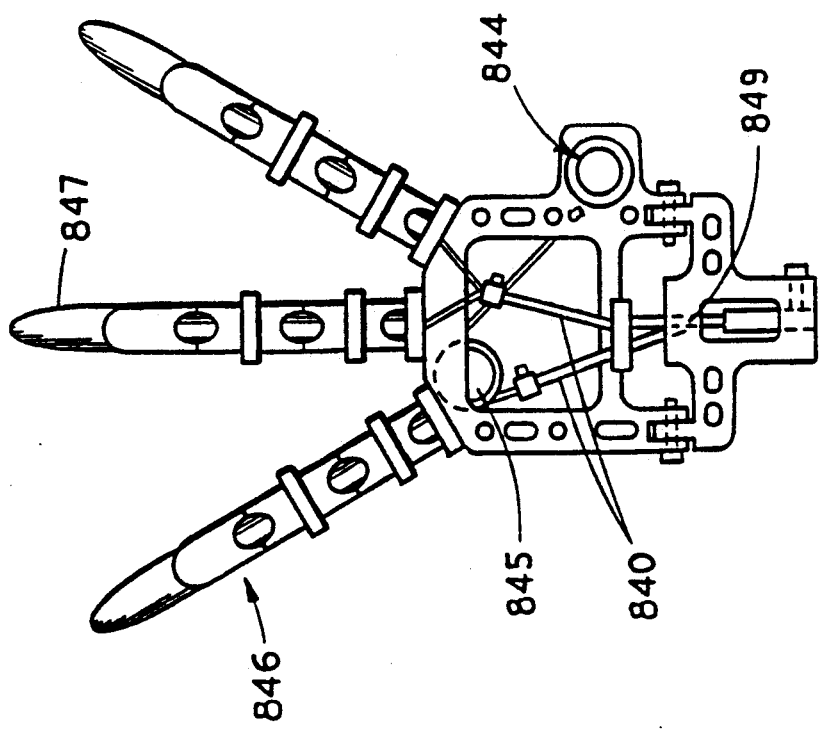
FIG. 11b is a front view of an alternative hand/wrist implementation for the animated character 110 of FIG. 1, also according to the present invention.

An alternative approach for implementing the wrist and hand operation entails modifying the structure of the wrist shown in FIG. 11a and replacing the hand of FIG. 11a with the hand of FIGS. 11b and 11c. In place of the two cables 836 of FIG. 11a running along the outside of arm, the approach of FIG. 11b includes two cables 840 running through a guide 842 in the center of the arm. In both cases the cables are used to contract the fingers. The approach of FIG. 11b, however, includes a thumb 844, extending in a direction out of the paper, which is contracted about a roller 845 in conjunction with the outside finger 846. This approach of FIG. 11b provides improved gripping and avoids impeding tension to the rotation of the wrist as the tension for the fingers is in the center, not at the outside of the arm.

Moreover, as illustrated in FIG. 11c, this alternative wrist operation provides a wrist gimbling function (bending or weak wrist function). FIG. 11c, illustrating a side view of the hand shown in FIG. 11b, depicts an additional pair of cables 919 connected at one end to a servo located near the center of the back, and to either side of the hand at the other end. The gimbling of the wrists occurs about a rotational point 849 in line with the aperture of the guide 842. This rotational point 849 is important, because it prevents the fingers from bending during gimbling. Thus, when the cable moves, the hand pulls forward or backward about the point 849.

Other differences between the approach of FIG. 11a and the approach of FIGS. 11b and 11c include removing the rotation return spring 838 and, in its place, providing a rotational drum to receive the cables from the side (perpendicular to the arm) such that the push/pull action of the cable directly controls the twist action of the wrist. This modification requires two lines (one cable exerting a rotational force) rather than the single line 843 (exerting a linear force) shown in FIG. 11a.

Control Of The Waist

Referring now to FIGS. 9, 10a, 17a-17d, the waist operates substantially the same as the neck and uses three similar servos; one direct drive servo 861 for rotation, and two indirect drive servos 862 and 863 (FIG. 12) for tilt front to back and right to left movement. The two indirect drive servos 862 and 863 control a single ball and socket joint 865 that will support movement in any direction (right to left or front to back) using cables 1151 in cable guides 1153 tied at four points about a plate 1155.

The ball and socket joint 865 is constructed in the same manner as the joint 710 for front side of the animated character, pass through springs 923. The ball and socket joint 865 is unevenly spring loaded with springs 923 to compensate for gravity and secondary motion caused by inertial forces created by the movement of the head, and upper body. Large coil springs 921 (FIG. 10a) prevent over-dampening shock to help support the weight of the body and to fight secondary motion caused by the movement of the upper body. These springs 921 alleviate the need for a spring around the cable 1151 at the front side of the animated character. The springs 923 have a larger spring constant than the front springs 921 to compensate for the center of gravity of the body being behind the waist column.

Waist rotation operates over a 60° span off centerline. Combined with the motion of the similar neck mechanism, the waist rotation allows the animated character to position its head to look at anything in the perpendicular plane directly in front of it.

The direct drive servo 861 operates the waist rotation in a less direct manner than the servos for the shoulders and head/neck. As illustrated in FIGS. 17a-17d, this operation includes brass rods 1159, connected to front and rear brass rod terminals 1161 and 1163, respectively, to pull a waist servo support plate 1157 and an upper body base plate 1158 about the aluminum (hollowed) core 1169 of the animated character. The servo 861 is supported by aluminum spacers 1156 which are bolted to the upper body waist plate 1158 and to the servo 861. The core 1169 is secured to the plate 1183 which is mounted to the ball portion of the joint 865. The socket portion of the joint 865 is secured to a bearing assembly 1175, which may be implemented using a sealed bearing, available from More Bearing, Denver, Colo. The top portion of the bearing assembly 1175 is coupled to an upper body plate 1173 to provide the rotation for the upper body of the animated character.

Control Of The Feet

FIG. 14 illustrates one of the feet of the animated character. The foot is a self-contained, simplified version of the hand. All toes in the foot are hooked directly to a servo in the sole of the foot, as previously discussed. Each toe is a scaled up version of the fingers. The feet are controlled as a single function and cannot be controlled separately. The structure of the feet, the finger nails 847 and toe nails 995 and the hands are preferably all composed of Friendly Plastic, except for the hand frame 898 which is preferably aluminum.

Non-Animated Features

Figure 12:
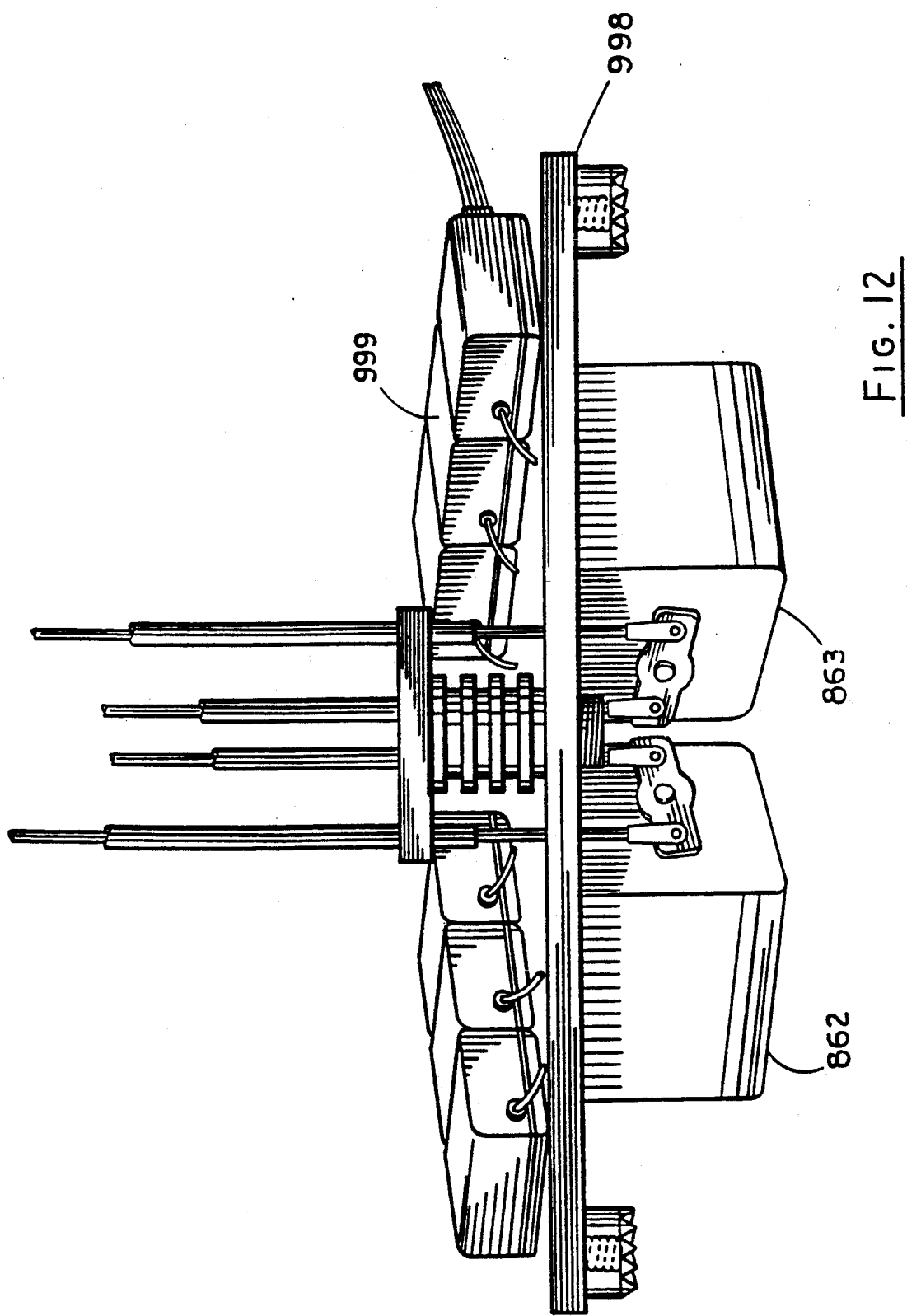
FIG. 12 is a front view of the lower section of the animated character 110 of FIG. 1.
Figure 13:
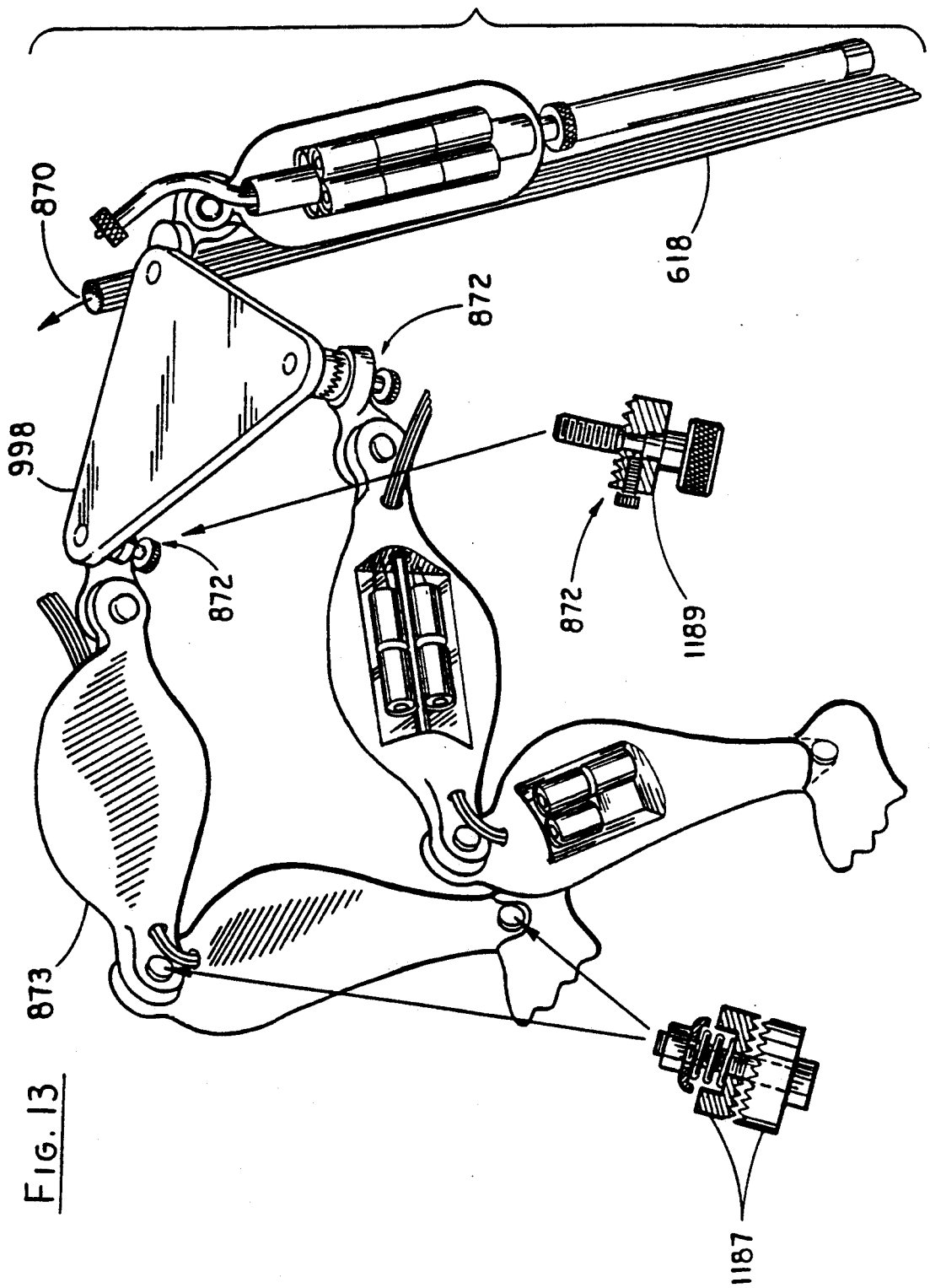
FIG. 13 is a perspective view of the legs and tail sections of the animated character 110 of FIG. 1.

The main support structure for the animated character is the base plate 998 (FIGS. 6 and 12). All the transmitters and receivers are attached to the base plate 998. On the top side of this plate are the five PCM receivers 999, all of which are shock mounted using thick, two way adhesive tape. The antenna ports of the five PCM receivers 999 are shielded and routed to a shielded 5-pin connector 870, as illustrated in FIG. 13. The connector 870 allows the tail to be easily removed.

On the underside of the base plate 998 are mounts 872 for the legs and tail. These mounts 872, which include a quick-release type knob, are adjustable to allow for lateral placement of the legs 873 and the tail 618. The tail 618 has an additional degree of freedom so that it can be rotated up and down as well. The leg joints are fitted with a captivated quick change knob so that the power supplies located in the legs can be easily replaced. Similar quick change knobs may be included with the tail so that the tail supply can be removed without disturbing the lower button-down or snap-on crotch assemblies. The indirect drive servos 862 and 863 for the waist, located on the underside of the base plate 998, are relatively large and require direct power lines from the power supply as well as the standard lines from the receivers (FIG. 7). A large bracket (not shown) on the underside of the base plate is used for mounting a voltage gauge 1184 (FIG. 6) indicating the remaining power for the animated character.

Power Supplies

All the power requirements for the animated character exist in the legs and tail. The legs house the main power supplies. Each leg includes three separate supplies for a total of six main power supplies. The animated character can run on any or all of these supplies depending on the particular application. As a rule, at least two separate supplies (packs) are saved as an emergency reserve. Each pack is made up of four 1.2 volt, 4.4 amp/hour nickel cadmium rechargeable D cells, wired in series to make a 4.8 volt, 4.4 amp/hour pack. When enabled, the six power packs are wired in parallel to create a main power supply with 4.8 volts potential and 26.4 amp/hours worth of current. Each leg pack is equipped with its own enable/disable switch and an 8 amp resetable circuit breaker. Each of these packs can be checked for charge level or bad cells with a meter mounted on the base plate 998. This is done by enabling the pack desired to test with the main power switch. The voltage gauge 1184 will read anywhere from fully charged 5.2 volts to a recharge level of 4.5 volts. Anything more or less indicates a possible problem and pack should not be used. When operating, the gauge always reads the operating voltage. The animated character will operate until voltage drops below the 4.5 volt range, at which time one or more reserve packs are manually connected or spare legs are installed. When changing legs, the following steps should be followed:

1) Turn off main power (located left rear of base plate).
2) Remove main power plug (located lower left hip).
3) Remove all foot servo connection plugs (one at upper left leg, one at each ankle).
4) Release quick change hips, and ankles.
5) Replace legs.
6) Reconnect hips and ankles.
7) Replug all removed connections.
8) Test each pack for proper voltage.
9) Implement desired packs (calves normally saved for reserve).
10) Resume operation.

The tail power supply is used for all electronics in the animated character that require a 12 volt supply. These electronics include the CCD camera video processor, and the audio/video transmitter. The tail power supply pack includes one 8-amp resetable breaker and eleven nickel cadmium 1.2 volt, 4.4 amp/hour D cells wired in series to make a 13.2 volt 4.4 amp/hour pack. The enable/disable switch for this pack is controlled using the sleep mode. When the sleep mode is not in use, its power plug should be disconnected. To replace the tail pack, the following steps are appropriate:

1) Remove power plug (located at top of pack).
2) Remove PCA antenna connection (located rear center of base plate).
3) Remove hip guard assembly.
4) Disconnect Dell star antenna cable (located left side of Dell star transmitter).
5) Release quick disconnect on tail.
6) Remove antenna assembly (held with velcro to battery pack).
7) Replace pack and reassemble.

The tail power supply should be checked with the voltage gauge prior to installation. If the voltage is greater than 16 volts or less than 12 volts, the tail power supply should not be used.

There are eight statically adjustable joints in the animated character. They are located in the hips, knees, ankles and tail to position the animated character in an appropriate position for its environment. These joints are implemented, as illustrated in FIG. 13, using aluminum parts 1187 and 1189. For best RF reception and transmission, the tail should be vertically oriented with respect to ground whenever possible. When using external power supplies, the voltage requirements are low, but the current requirements vary according to the activity of the animated character.

Figure 18:
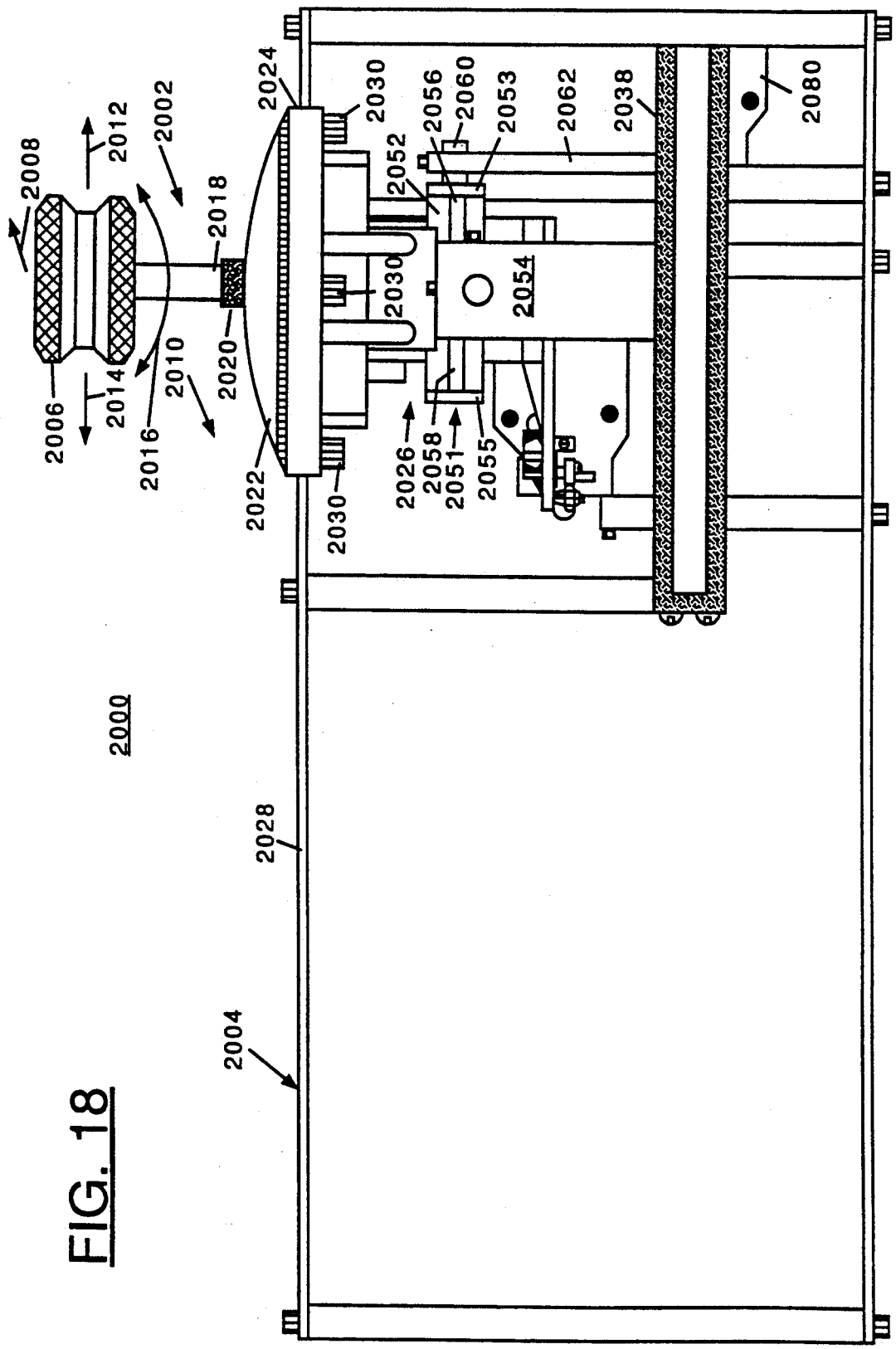
FIG. 18 is an end view of a motorized three dimensional joystick constructed in accordance with the principles of the present invention.
Figure 19:
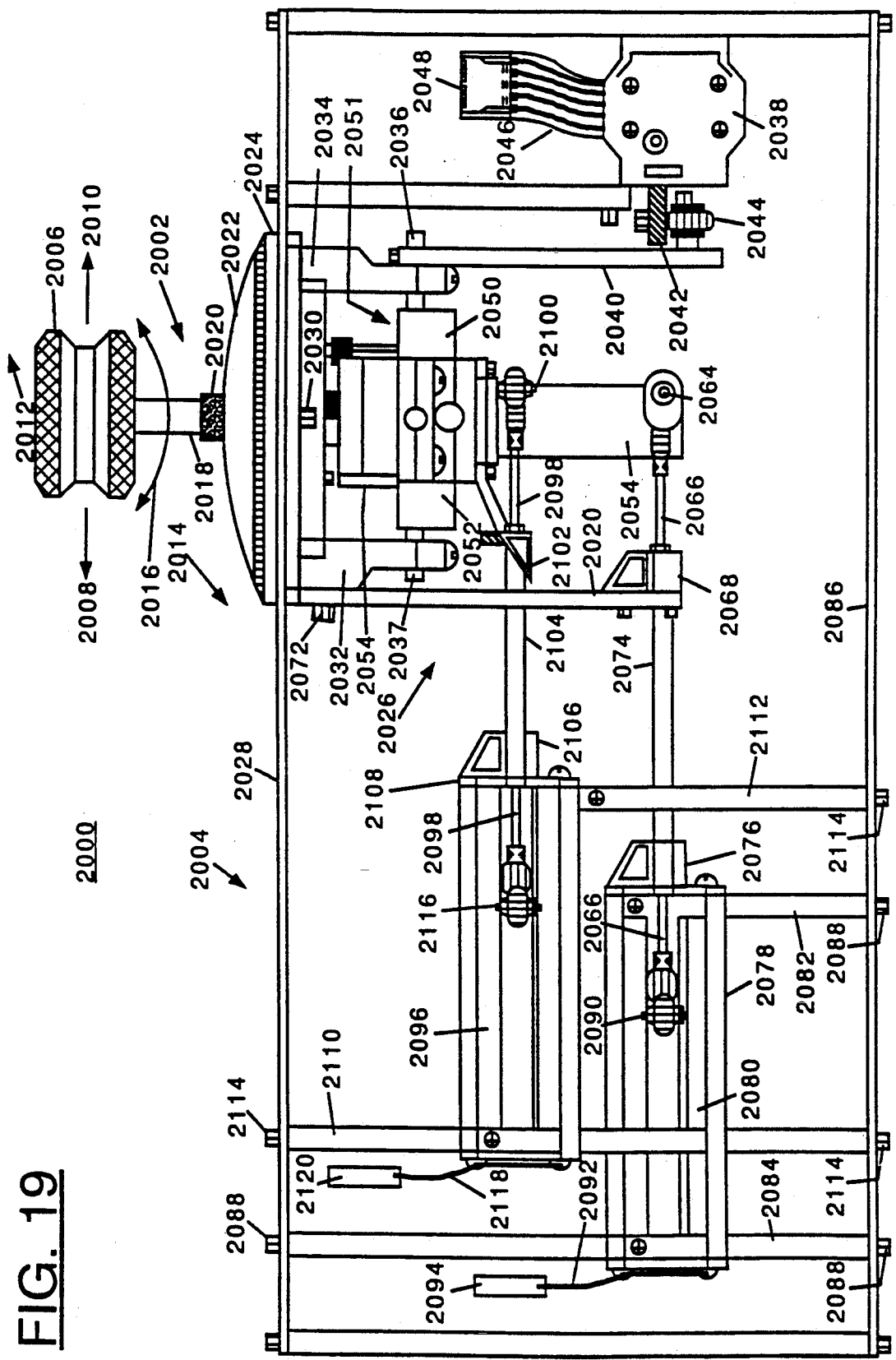
FIG. 19 is a side view of the joystick illustrated in FIG. 18.

The functions of the head of the animated character such as tilting to the left and to the right, nodding up and down, and rotating about the neck can be controlled by a motorized three dimensional joystick illustrated in FIGS. 18 and 19 and indicated generally by the reference numeral 2000. The motorized three dimensional joystick includes a joystick or handle generally designated by the reference numeral 2002. The joystick or handle 2002 is mounted in a panel housing generally designated by the reference numeral 2004.

The portion of the joystick or handle 2002 that is grasped by an operator includes a knurled knob 2006 that can be grasped in the hand or fingers of an operator and moved forward in the direction of arrow 2008 or backward in the direction of arrow 2010. This movement could move the head of the animated character forward and backward or move an object in a video game forward and backward. In addition, the joystick 2002 can be moved to the right in the direction of arrow 2012 or to the left in direction of arrow 2014. This movement of the joystick 2002 could tilt the head of the animated character right and left or move an object in a video can right and left. The joystick 2002 can also be rotated about its axis in either a clockwise or counterclockwise direction corresponding to the arrow 2016. The rotation of the joystick 2002 could cause rotation of the head of the animated character or object in a video game.

The knob 2006 is connected to the motorized joystick 2000 by a post 2018. A collar 2020 couples the post 2018 to a cover 2022. The cover 2022 is secured to a joystick frame 2024 which serves as the frame for a universal joint or universal mount generally designated by the reference numeral 2026. The universal joint or mount 2026 mounts the joystick 2002 relative to the panel housing 2004 allowing universal three dimensional movement of the joystick 2002.

The joystick frame 2024 supports the joystick or handle 2002 and is rigidly mounted to a top panel 2028 that defines the upper surface of the panel housing 2004. The joystick frame 2024 is secured to the top panel 2028 by several fasteners such as screws 2030. The joystick frame 2024 includes a first leg 2032 and a second leg 2034 that extend into the panel housing 2004. As illustrated in FIG. 19 a first pivot rod 2036 extends through the second leg 2034 of the joystick frame 2024 and a second pivot rod 2037 extends through the first leg 2032. The first pivot rod 2036 extends into a first side 2050 of a frame member 2051 and the second pivot rod 2037 extends into a second side 2052. The frame member 2051 is a hollow square with the first side 2050 and the second side 2052.

As the knob 2006 is moved in the direction of the arrow 2012 or the arrow 2014, the pivot rod 2036 is rotated. This movement of the joystick 2002 is physically connected to a first linear motor 2038 by a connecting rod 2040 that is rigidly connected to the pivot rod 2036 at a first end and connected at a second end to a slider 2042 of the first linear motor 2038 by a connector 2044. The first linear motor 2038 is of a type that includes a memory and preferably is a Model No. MF100-8T linear motor sold by Out Board Electronics, Ltd. of London, England, disclosed and claimed in United Kingdom Patent Application 2,207,812, filed Aug. 7, 1987 by Out Board Electronics, Ltd. and disclosed and claimed in International Patent Application No. PCT-GB88-00632 filed Jul. 29, 1988.

The first linear motor 2038 is connected to a ribbon cable 2046 terminated by a ribbon plug 2048. The ribbon plug 2048 may be plugged into a PC expansion board processor and software that receives signals from the linear motor 2038. Consequently, the movement of the joystick 2002 in the direction of the arrows 2012 and 2014 is transmitted to the linear motor 2038 through the connecting rod 2040.

Mounted within the frame member 2051 is a post extension member 2054. The post extension member 2054 extends downwardly below the joystick frame 2024 into the open interior of the frame member 2051. The post 2018 is rotatably mounted in the post extension member 2054. The post extension member 2054 is rotatably mounted on a first rotation pin 2056 mounted in a third side 2053 of the frame member 2051 and a second rotation pin 2058 mounted in a fourth side 2055 of the frame member.

The outside end 2060 of the first rotation pin 2056 (FIG. 18) is rigidly secured to a extension rod 2062. The lower end of the extension rod 2062 is connected by a pin 2064 to a first flexible cable 2066 (FIG. 19). The first flexible cable 2066 extends from the pin 2064 through a cable holder 2068 that is rigidly secured to a frame member 2070. The frame member 2070 is fixed to the first leg 2032 of the joystick frame 2024 by a fastener or pin 2072. A plastic or similar low friction material tubular cover 2074 extends between the first cable holder 2068 to a second cable holder 2076. The first flexible cable 2066 extends through the tubular cover 2074 to the second cable holder 2076. The second cable holder 2076 is rigidly mounted on a linear motor frame 2078 that mounts a second linear motor 2080 to the panel housing 2004. The linear motor frame 2078 is mounted on supports 2082 and 2084 that are secured by fasteners 2088 to the top panel 2028 and bottom panel 2086. The first flexible cable 2066 extends out of the tubular cover 2074 and is connected to a slider 2090 of the second linear motor 2080. As a result of this connection, the movement of the joystick 2002 in the forward direction along arrow 2008 and the backward direction along the arrow 2010 is transmitted by way of the extension rod 2062 to the first flexible cable 2066. The movement of the first flexible cable 2066 is directly connected to a slider 2090 on the second linear motor 2080. Due to the flexibility of the cable 2066, it can move relative to the frame member 2070 to compensate for movement of the extension rod 2062. The forward and backward movement of the joystick 2002 is inputed into the second linear motor 2080 and converted to a signal that is transmitted by a ribbon cable 2092 connected to a PC expansion board by a ribbon plug 2094.

Rotation of the joystick 2002 in the direction of the arrow 2016 is transmitted to a third linear motor 2096 to rotate the head of the animated character or to cause rotational movement of another device. The third linear motor 2096 is identical to the second linear motor 2080 and the first linear motor 2038. Each of these motors includes memory and is available from Out Board Electronics, Ltd.

The rotational movement of the joystick 2002 is coupled to the third linear motor 2096 by a second flexible cable 2098. The second flexible cable 2098 includes a first end that is secured to the post extension member 2054 by a pin 2100. The second flexible cable 2098 extends from the pin 2100 through a third cable holder 2102 that is secured to the post extension member 2054. A second tubular cover 2104 extends from the third cable holder 2102 to a fourth cable holder 2106. The fourth cable holder 2106 is rigidly mounted on a frame 2108 that mounts the third linear motor 2096 to the panel housing 2004 by support members 2110 and 2112. The support members 2110 and 2112 are mounted to the top panel 2028 and the bottom panel 2086 by fasteners 2114. The second flexible cable 2098 extends beyond the fourth cable holder 2106 and is secured to a slider arm 2116 of the third linear motor 2096. Similar to the first linear motor 2038 and the second linear motor 2080, the third linear motor 2096 includes a ribbon cable 2118 and ribbon plug 2120 that are connected to a PC expansion board.

The present invention allows the joystick 2002 to be operated in a desired sequence to move an animated character or other device in accordance with this sequence. Since each of the linear motors 2038, 2080 and 2096 includes a memory, a sequence of movements, front, back, left, right and rotational, can be programmed into these memories. Once programmed, the animated character or other device can be run through the sequence without the operator moving the joystick 2002. The linear motors, 2038, 2080 and 2096 are touch sensitive, however, such that during a programmed sequence of operation, if the operator desires to re-program or interrupt the sequence, the joystick 2002 maybe grasped by the operator. This action immediately disengages the linear motors 2038, 2080 and 2096 allowing the memory of these linear motors to be re-programmed as desired.

The motorized three dimensional joystick 2000 as illustrated in FIGS. 18 and 19 allows quick, smooth and accurate response of the animated character or other device to movement of the joystick 2002. The use of the flexible cables 2066 and 2098 minimizes inertia thereby minimizing or even eliminating secondary motion, harmonics and overshooting of the animated character or other device that is electronically connected to the motorized three dimensional joystick 2000. A motorized three dimensional joystick that can be pre-programmed, the pre-programmed sequence interrupted at any time, and the minimization or elimination of inertia that causes secondary motion, harmonics and overshooting has not been previously available.

While the invention has been particularly shown and described with reference to a preferred embodiment, as mentioned above, those skilled in the art will recognize that various modifications and changes may be made to the present invention without departing from the spirit and scope thereof.

What is claimed is:

1. A system for controlling an animated character, comprising:
    an animated character, responsive to its surrounding environment, having sensor means for monitoring the surrounding environment and generating sensor signals in response thereto, the animated character including a speaker for generating audible sounds for an audience; and
    a control station, remotely located from the animated character, including reception means for receiving the sensor signals, and multiple control means, arranged to be operated by a user, for generating control signals in response to the sensor signals to control the animated character interactively with its surrounding environment, the multiple control means including a first manually-operated device type and a second manually-operated device type, wherein the multiple control means is used to generate the audible sounds through the speaker so as to simulate live communication with the audience.

2. The system as recited in claim 1, wherein the first manually-operated device type includes foot control means operated by the foot of a user.

3. The system as recited in claim 1, wherein the first manually-operated device type includes foot control means operated by the foot of a user, and the second manually-operated device type includes joystick means.

4. The system as recited in claim 1, wherein the second manually-operated device type includes joystick means.

5. The system as recited in claim 1, wherein the multiple control means is operated by at least two users.

6. The system as recited in claim 1, wherein the sensor means includes a microphone, located in close proximity to the animated character, for detecting external sounds.

7. The system as recited in claim 6, wherein the reception means includes audio means, responsive to the microphone, for generating the sounds detected thereby.

8. The system as recited in claim 1, wherein the sensor means includes a video camera, located in close proximity to the animated character, for viewing objects in the surrounding environment.

9. The system as recited in claim 8, wherein the reception means includes visual means, responsive to the video camera, for displaying the objects viewed thereby.

10. The system as recited in claim 1, wherein the multiple control means includes a microphone for generating utterances through the speaker.

11. The system as recited in claim 1, wherein the animated character includes a body having a plurality of movably controllable members which move in response to the control signals generated by the multiple control means.

12. A control station for use in remotely controlling an animated character having a speaker for simulating live communication with an audience, wherein the animated character includes sensor means for monitoring its surrounding environment and generating sensor signals in response thereto, comprising:
    reception means for receiving the sensor signals; and
    multiple control means, arranged to be operated by a user, for generating control signals in response to the sensor signals to control the animated character interactively with its surrounding environment, the multiple control means including a first manually-operated device type and a second manually-operated device type and controls audible sounds through the speaker of the automated character.

13. The control station as recited in claim 12, wherein the the reception means includes audio means, responsive to the sound signals generated by the sensor means, for generating the sounds detected by the sensor means.

14. The control station as recited in claim 13, wherein the reception means further includes visual means, responsive to video signals generated by the sensor means, for displaying the objects viewed by the sensor means.

15. The control station as recited in claim 14, wherein the multiple control means includes a microphone for generating utterances through the animated character.

16. The control station as recited in claim 15, wherein the multiple control means generates said control signals for controlling the movement of the animated character.

17. The control station as recited in claim 16, wherein the first manually-operated device type includes foot control means operated by the foot of a user.

18. The control station as recited in claim 16, wherein the second manually-operated device type includes joystick means.

19. A system for controlling an animated character, comprising:
    an animated character, responsive to its surrounding environment, including
        a speaker, and
        sensor means for monitoring the surrounding environment and generating sensor signals in response thereto, the sensor means including a microphone for sensing sounds and a video camera for sensing objects; and a control station, remotely located from the animated character, including
    reception means for receiving the sensor signals, the reception means including visual means for displaying the objects sensed by the video camera and audio means for generating the sounds sensed by the microphone, and
    multiple control means, arranged to be operated by a user, for generating control signals in response to the sensor signals to control the animated character interactively with its surrounding environment, the multiple control means including foot control means operated by the foot of a user, joystick means, and a microphone for generating utterances through the speaker.

20. The system as recited in claim 19, wherein the multiple control means is operated by at least two users.

* * * * *